US007197381B2

(12) United States Patent
Sheikh et al.

(10) Patent No.: US 7,197,381 B2
(45) Date of Patent: Mar. 27, 2007

(54) NAVIGATIONAL SYSTEM AND METHOD UTILIZING SOURCES OF PULSED CELESTIAL RADIATION

(75) Inventors: Suneel Ismail Sheikh, College Park, MD (US); Darryll John Pines, Clarksville, MD (US); Kent S. Wood, Chevy Chase, MD (US); Paul Shelton Ray, Alexandria, VA (US); Michael N. Lovellette, Seabrook, MD (US)

(73) Assignee: University of Maryland, College Park, MD (US)

( * ) Notice: Subject to any disclaimer, the term of this patent is extended or adjusted under 35 U.S.C. 154(b) by 714 days.

(21) Appl. No.: 10/728,869

(22) Filed: Dec. 8, 2003

(65) Prior Publication Data

US 2005/0192719 A1    Sep. 1, 2005

(51) Int. Cl.
*G06F 7/00* (2006.01)
*G06F 17/00* (2006.01)

(52) U.S. Cl. .................... 701/13; 701/3; 250/203.1; 250/578.1; 33/268; 33/269

(58) Field of Classification Search ................ 701/13, 701/3; 250/203.1, 578; 33/268, 269
See application file for complete search history.

(56) References Cited

U.S. PATENT DOCUMENTS

| 3,714,432 | A | * | 1/1973 | Jalink, Jr. ............... 250/340 |
| 3,737,790 | A | * | 6/1973 | Brown .................... 327/339 |
| 3,793,518 | A | * | 2/1974 | Harper ................... 250/347 |
| 3,825,754 | A | * | 7/1974 | Cinzori et al. .......... 250/338.1 |
| 3,834,653 | A | * | 9/1974 | Perkel .................... 244/166 |
| 3,920,994 | A | * | 11/1975 | Cargille ................. 250/347 |
| 3,940,753 | A | * | 2/1976 | Muller ................... 250/338.1 |
| 4,056,738 | A | * | 11/1977 | Gustafson ............... 327/73 |
| 4,088,906 | A | * | 5/1978 | Huellwegen ............ 327/73 |
| 4,119,918 | A | * | 10/1978 | Moser .................... 327/87 |
| 4,155,007 | A | * | 5/1979 | Beckmann .............. 250/253 |

(Continued)

OTHER PUBLICATIONS

Stimets et al., The celestial view from a relativistic starship, Journal British Interplanetary Society, v 34 p. 83-99 (from Dialog(R) File 14, acc. No. 0000130609).*

(Continued)

*Primary Examiner*—Cuong Nguyen
(74) *Attorney, Agent, or Firm*—Rosenberg, Klein & Lee

(57) ABSTRACT

A system and method for navigation utilizing sources of pulsed celestial radiation are provided. A spacecraft, satellite, or other vehicle (12) has a pulse sensor (22) mounted thereto for detecting signal pulses (14) generated by a plurality of pulsars or other celestial objects (16). The detected signal pulses (14) are synchronously averaged at the known period of the pulsar or other celestial object (16) with respect to a timer (24). Timer (24) measures the pulse time of arrival at the pulse sensor (22) by comparing the pulse signal (14) with a pulse shape template (52), and a processing means (30) calculates the offset time between the measured pulse time of arrival at sensor (22) with a calculated pulse time of arrival at the solar system barycenter (SSBC). The positions and pulse profile characteristics of the pulsars (16) are stored in a digital memory (34) and combining the calculated time offset with the known positions of pulsars (16), the navigational position, velocity, attitude and time of spacecraft (12) with respect to the SSBC can be calculated.

21 Claims, 11 Drawing Sheets

U.S. PATENT DOCUMENTS

| | | | | |
|---|---|---|---|---|
| 4,263,555 | A | * | 4/1981 | Hunka .................... 327/323 |
| 4,426,591 | A | * | 1/1984 | Cargille .................. 327/72 |
| 4,992,675 | A | * | 2/1991 | Conner et al. ............ 327/72 |
| 2005/0192719 | A1 | * | 9/2005 | Sheikh et al. ............ 701/13 |

OTHER PUBLICATIONS

Markley et al., Attitude control system of the Wilkinson Microwave Anisotropy Probe, NASA Goddard Space Flight Center, Greenbelt, Maryland 20771, Journal of guidance, control, and dynamics, 2005, 28(3) (from Dialog(R) File 144, acc. No. 17204032 Pascal No. 05-0275169).*

Hoag et al., Navigation and guidance in interstellar space,Jornal Acta Astronautica vol. 2 No. 5-6, p. 513-33, May-Jun. 1975 (from Dialog(R) File 2, acc. No. 01851172).*

Walker et al., AFCRL Infrared sky survey, vol. 1—Catalog of Observation s at 4, 11, and 20 Microns, Report No. AFCRL-TR-75-0373, AFCRL-ERP-522, (from Dialog(R) File 6, acc. No. 0523586 NTIS Accession No. AD-A016 397/2/XAB).*

8Farthing et al., Device for determining relative angularposition between a spacecraft and a radiation emitting celestial body, Report No. NASA-CASE-GSC-11444-1; Patent-3 744 913, Filed Patented Jul. 10, 1973, 9P. (from Dialog(R) file 6, acc. No. 0403630).*

Sheikh, The use of varikable celestial X-ray soruces for spacecraft navigation, University of Maryland Thesis, College Park 2005, Dialog(R) file 35, acc. No. 02103188).*

Schultz et al., UMBRAS—a matched occulter and telescope for imaging extrasolar planets, SPIE Proceeding Series, v SPIE-4860, p. 54-61, 2003 (from Dialog(R) file 57, Acc. No. 0000271820).*

Harmon et al., Optical trrackers in space, Journal of Society of America, v9 n11 Nov. 1962 (from Dialog(R) File 8, acc. No. 0001546732 E.I. No. 19630034466).*

W.G. Melbourne, "Navigation Between The Planets", Scientific American, vol. 234, No. 6, Jun. 1976, pp. 58-74.

J.F. Jordan, "Navigation of Spacecraft on Deep Space Missions", Journal of Navigation, vol. 40, Jan. 1987, pp. 19-29.

C.J. Weeks, et al., "Analytical Models of Doppler Data Signatures", paper AAS 94-178, Advances in Astronautical Sciences, vol. 87, No. 2, 1994.

R. Gounley, et al. "Autonomous Satellite Navigation by Stellar Refraction", Journal of Guidance and Control, vol. 7, No. 2, Mar.-Apr. 1984, pp. 129-134.

D.C. Folta, et al. Autonomous Navigation Using Celestial Objects:, paper AAS 99-439, presented at the American Astronautical Society Astrodynamics Specialist Conference, Aug. 1999, pp. 2161-2177.

G.S. Downs, "Interplanetary Navigation Using Pulsating Radio Sources" NASA Technical Reports N74-34150, Oct. 1, 1974, pp. 1-12.

Kevin Wallace, "Radio Stars, What They Are and The Prospects for Their Use in Navigational System", Journal of Navigation, vol. 41, Sep. 1988, pp. 358-374.

T.J. Chester, et al., "Navigation Using X-ray Pulsars" NASA Technical Reports N81-27129, Jun. 15, 1981, pp. 22-25.

K.S. Wood, "Navigation Studies Utilizing The NRL-801 Experiment and The Argos Satellite", Small Satellite Technology and Applications III, Ed. B.J. Horais, SPIE Proceedings, vol. 1940, 1993, pp. 105-116.

John Eric Hanson, "Principles of X-Ray Navigation", Doctoral Dissertation, Stanford University, Mar. 1996.

K.S. Wood, et al., "The USA Experiment on The Argos Satellite: A Low Cost Instrument for Timing X-Ray Binaries", EUV, X-Ray, and Gamma-Ray Instrumentation for Astronomy V, Eds. O.H. Siegmund & J.V. Vallerga, SPIE Proceedings, vol. 2280, 1994, p. 19.

K.S. Wood, et al., "The USA Experiment on The Argos Satellite: A Low Cost Instrument for Timing X-Ray Binaries", The Evolution of X-ray Binaries, Eds. S.S. Holt and C.S.Day, America Institute of Physics Proceedings, No. 308, 1994, p. 561-564.

P.S. Ray, et al., The USA X-Ray Timing Experiment:, American Institute of Physics Conference Proceedings, vol. 599, 2001, p. 336.

G.S Downs, et al., "Techniques for Measuring Arrival Times of Pulsar Signals 1: DSN Observations from 1968 to 1980", NASA Technical Reports N80-33317, Aug. 15, 1980, pp. 1-80.

J.H. Taylor et al., "Recent Progress in the Understanding of Pulsars", Annual Review of Astronomy and Astrophysics, vol. 24, 1986, pp. 285-327.

P.S. Ray, et al., "Absolute Timing of the Crab Pulsar: X-Ray, Radio, and Optical Observations", American Astronomical Society Meeting #201, Dec. 2002.

P.S. Ray, et al., "Absolute Timing of the USA Experiment Using Pulsar Observations", American Astronomical Society, HEAD Meeting #35, Mar. 2003.

K.S. Wood, et al., "The Heao A-1 X-Ray Source Catalog", Astrophysical Journal Supplemental Series, vol. 56, Dec. 1984, pp. 507-649.

W. Voges, et al., "The Rosat All-Sky Survey Bright Source Catalogue (1RXS)", Astronomy and Astrophysics, vol. 349, 1999, pp. 389-405.

W. Voges, et al., The Rosat All-Sky Survey Faint Source Catalogue, International Astronomical Union Circular 7432, May 2000.

R.N. Manchester, et al., "The Parkes Multi-Beam Pulsar Survey", Monthly Notices of the Royal Astronomical Society, vol. 328, 2001, pp. 17-35.

G.B. Hobbs, et al. "A New Pulsar Catalog", to be published in the Astronomical Journal.

J.H. Taylor, et al., "Catalog of 558 Pulsars", Astrophysical Journal Supplemental Series, vol. 88, 1993, pp. 529-568.

D.N. Matsakis, et al., "A Statistic for Describing Pulsar and Clock Stabilities", Astronomy and Astrophysics, vol. 326, 1997, pp. 924-928.

V. M. Kaspi, et al., High-Precision Timing of Millisecond Pulsars. III.Long-Term Monitoring of PSRS B1855+09 and B1937+21, Astrophysical Journal, vol. 428, Jun. 1994, pp. 713-728.

A.G. Lyne, et al., "Jodrell Bank Crab Pulsar Timing Results, Monthly Ephemeris", University of Manchester, Aug. 13, 2002 Unpublished.

J.H. Taylor, "Pulsar Timing and Relativistic Gravity", Philosophical Transactions Royal Society of London, vol. 341, 1992, pp. 117-134.

R.W. Hellings, "Relativistic Effects in Astronomical Timing Measurements", Astronomical Journal, vol. 91, No. 3, Mar. 1986, pp. 650,659.

Theodore D. Moyer, "Transformation from Proper Time on Earth to Coordinate Time in Solar System Barycentric Space-Time Frame of Reference, Part 1", Celestial Mechanics, vol. 23, 1981, pp. 33-56.

Theodore D. Moyer, "Transformation from Proper Time on Earth to Coordinate Time in Solar System Barycentric Space-Time Frame of Reference, Part 2", Celestial Mechanics, vol. 23, 1981, pp. 57-68.

J. B. Thomas, "Reformulation of the Relativistic Conversion Between Coordinate Time and Atomic Time", Astronomical Journal, vol. 80, No. 5, May 1975, pp. 405-411.

D.C. Backer, et al., "Pulsar Timing and General Relativity", Annual Review of Astronomy and Astrophysics, vol. 24, 1986, pp. 537-575.

P. Stumpff, "On The Computation of Barycentric Radial Velocities with Classical Perturbation Theories", Astronomy and Astrophysics, vol. 56, 1977, pp. 13-23.

P. Stumpff, "The Rigorous Treatment of Stellar Aberration and Doppler Shift, and The Barycentric Motion of the Earth", Astronomy and Astrophysics, vol. 78, 1979, pp. 229-238.

Duncan R. Lorimer, "Binary and Millisecond Pulsars at the New Millennium", Living Review in Relativity, Max Planck Institute for Gravitational Physics, Albert Einstein Institute, Germany, Jun. 2001.

C.F. Martin et al. "Relativistic Effects on an Earth-Orbiting Satellite in the Barycenter Coordinate System", Journal of Geophysical Research, vol. 90, No. B11, Sep. 1985, pp. 9403-9410.

Clifford M. Will et al., "Conservation Laws and Preferred Frames in Relativistic Gravity. I. Preferred-Frame Theories and Extended PPN Formalism", Astrophysical Journal, vol. 177, Nov. 1972, pp. 757-774.

K. Nordtvedt, Jr., et al., "Conservation Laws and Preferred Frames in Relativistic Gravity. II. Experimental Evidence to Rule Out Preferred-Frame Theories of Gravity", Astrophysical Journal, vol. 177, Nov. 1972, pp. 775-792.

Gary W. Richter, et al., "Second-Order Contributions to Relativistic Time Delay in the Parameterized Post-Newtonian Formalism", Physical Review D, vol. 28, No. 12, Dec. 1983, pp. 3006-3012.

Neil Ashby et al., "Coordinate Time On and Near The Earth", Physical Review Letters, vol. 53, No. 19, Nov. 1984, p. 1858.

Irwin I. Shapiro, "Fourth Test of General Relativity", Physical Review Letters, vol. 13, No. 26, Dec. 1964, pp. 789-791.

L. A. Rawley et al., "Fundamental Astrometry and Millisecond Pulsars", Astrophysical Journal, vol. 326, Mar. 1988, pp. 947-953.

V.M. Kaspi, "High-Precision Timing of Millisecond Pulsars and Precision Astrometry", Proceedings of 166th Symposium of the International Astronomical Union, Eds. E. Hog and P. Kenneth Seidelmann, Aug. 1994, pp. 163-174.

J.F. Bell, "Radio Pulsar Timing", Advances in Space Research, vol. 21, No. 1/2, 1998, pp. 137-147.

J.H. Taylor et al., "Further Experimental Tests of Relativistic Gravity Using the Binary Pulsar PSR 1913+16", Astrophysical Journal, vol. 345, Oct. 1989, pp. 434-450.

Roger Blandford, et al., "Arrival-Time Analysis for a Pulsar in a Binary System", Astrophysical Journal, vol. 205, Apr. 1976, pp. 580-591.

Sergei M. Kopeikin, "Millisecond and Binary Pulsars as Nature's Frequency Standards-II. The Effects of Low-Frequency Timing Noise on Residuals and Measured Parameters", Monthly Notices of the Royal Astronomical Society, vol. 350, 1999, pp. 563-590.

P. Kenneth Seidelmann, Ed., Explanatory Supplement to the Astronomical Almanac, University Science Books, 1992, Portion of Chapter 2.

* cited by examiner

NAVIGATIONAL SYSTEM AND METHOD UTILIZING SOURCES OF PULSED CELESTIAL RADIATION

BACKGROUND OF THE INVENTION

1. Field of the Invention

The subject invention relates to a system and method for navigation utilizing sources of pulsed celestial radiation. In particular, the present invention directs itself to a mobile receiver for detecting pulsed signals generated by celestial sources of pulsed radiation. The mobile receiver is mounted on a spacecraft, satellite, planetary rover, or other vehicle and the received pulses are used for the calculation of navigational data for the vehicle. More particularly, this invention directs itself to a clock or timer in communication with the mobile receiver for generating a timing signal corresponding to the reception and detection of the pulsed celestial radiation. The timing signal is used to calculate a time offset between predicted and measured pulse reception at the mobile receiver. Incorporating predetermined models of the pulse arrival times within an inertial reference frame, a position offset of the mobile receiver can then be determined using the time offset.

Further, the mobile receiver is in communication with a digital memory system. The digital memory system stores information including the positions and pulse timing model parameters of known sources of pulsed celestial radiation with respect to the chosen inertial reference frame. Additionally, this invention directs itself to a navigational system including a processing means for calculating navigational data of the spacecraft, satellite, planetary rover, or vehicle based upon the calculated time offset in combination with the known positional and pulse timing model data of the sources of celestial radiation stored within the digital memory system.

2. Prior Art

Celestial objects, or sources, have been utilized throughout history as navigational aids. The motions of the Sun, Moon, and planets, as observed from the Earth's surface, have provided the concept of time, and are a form of a celestial clock. Using catalogued almanac information, the observation of visible stars have provided travelers on the Earth a means to determine position information relative to observation stations fixed on the Earth. As these methods have matured over time, and with the addition of instrumented time clocks, or chronometers, the performance of navigation methods have improved.

Navigation of vehicles above and beyond the Earth's surface have benefitted from this knowledge of celestial source-based navigation. Satellites orbiting the Earth and spacecraft traveling throughout the Solar System have relied on celestial sources to successfully complete their missions. Additionally, celestial source navigation systems have been augmented with human-made systems to further increase vehicle and spacecraft navigation performance. In fact, a wide variety of methods have been used to compute the navigation information of spacecraft which have traveled around the Earth, through the Solar System, and beyond the Solar System's outer planets, as far as the heliopause.

Navigation of spacecraft is defined as determining the spacecraft's three-dimensional position, velocity, and attitude at a specific time or times. Position determination of near-Earth missions have included the use of ground-based radar and optical tracking, Earth-limb horizon sensors, Sun sensors, and Global Positioning System (GPS) receivers. These sensors use knowledge and observations of celestial objects and phenomena to determine position relative to the Earth. The GPS system produces signals from multiple transmitting satellites that allow a receiver to determine its position from the ranges to the transmitting satellites. Position determination of spacecraft on interplanetary missions have utilized Doppler radar range measurements, standard radio telemetry, and target body imagery. Attitude, or orientation, of spacecraft has typically been determined using magnetometers, gyroscopes, star cameras, star trackers, Earth-limb horizon sensors and Sun sensors. Time has often been determined using a clock on-board the spacecraft, or through periodic computer resets from ground control stations.

Radar range and tracking systems have been the predominant system for tracking and maintaining continuous orbit information of spacecraft. In order to compute position of spacecraft, radar range systems compute the range and/or the angular orientation angles to the spacecraft relative to an observing station. This is achieved primarily through the reflection of signals transmitted from an Earth observing station by the space vehicle structure and measurement of the transmitted signal round-trip time. Although this system requires no active hardware on the spacecraft itself, it does require an extensive ground tracking system and careful analysis of the measured data against an electromagnetically noisy background environment. Using the best known position of the observing station and processing multiple radar measurements, the vehicle's orbit parameters can be computed. The position of the vehicle can be propagated analytically ahead in time using standard orbital mechanics along with known models of solar system object's gravitational potential field; as well as any known disturbance or perturbations effects, such as object body atmospheric drag. This propagated navigation solution is then compared to subsequent radar measurements and the navigation solution is corrected for any determined errors. This process continues until a satisfactory navigation solution converges which is within the expedition's required parameters. However, vehicle maneuvers or any unaccounted for disturbances will affect the trajectory of the vehicle. Without exact knowledge of these maneuver dynamics or disturbance effects, it is necessary for the propagation and radar measurement comparison to continue throughout the flight.

As the spacecraft moves further away from Earth observation stations, the error in navigational data increases. To achieve the necessary range determination, the radar system requires knowledge of the observation station's position on the Earth to great accuracy. With sophisticated surveying systems, including GPS, such accuracy may be achieved. However, even with this precise knowledge, the position measurement can only be accurate to a finite angular accuracy. The transmitted radar beam, along with the reflected signal, travels in a cone of uncertainty. This uncertainty degrades the position knowledge in the transverse direction of the vehicle as a linear function of distance. As the vehicle gets more distant, any fixed angular uncertainty reduces the knowledge of vehicle position, especially in the two transverse axes relative to the range direction. Even utilizing interferometry, using the difference between multiple signals compared at two ranging stations, the angular uncertainty rapidly grows above acceptable limits.

Alternatively, many deep space spacecraft have employed active transmitters to be used for navigational purposes. The radial velocity is measured at a receiving station by measuring the Doppler shift in the frequency of the transmitted signal. The spacecraft essentially receives a "ping" from the Earth observation station and re-transmits the signal back to the Earth. Although improvements in the range measurement are made utilizing such system, transverse axis errors still exist, and this method has errors that also grow with distance.

Optical tracking measurements for spacecraft position and orbit determination are completed in a similar fashion as radar tracking. Optical tracking uses the visible light reflected off a vehicle to determine its location. Some optical measurements require a photograph to be taken and the vehicle's position is calculated after analysis of the photograph and comparison to a fixed star background. Real-time measurements using such systems are typically not easily achieved. Additionally, optical measurements are limited by favorable weather and environmental conditions. Because most missions have been oriented around planetary observation, augmentation to the ranging navigation system can be made within the vicinity of the investigated planet. By taking video images of the planet and comparing to known planetary parameters (such as diameter and position), the video images can determine position of the spacecraft relative to the planet. Since, often the objective is to orbit the planet, only relative positioning is needed for the final phase of the flight and not absolute position.

To aid the position determination process, an accurate clock is a fundamental component to most spacecraft navigation systems. On-board clocks provide a reference for the vehicle to use as its own process timer and for comparison to other time systems. Atomic clocks provide high accuracy references and are typically accurate to within one part in $10^9$–$10^{15}$ over a day. As calculated by Melbourne in "Navigation Between the Planets", *Scientific American,* Vol. 234, No. 6, June 1976, pp. 58–74, in order to track radio signals at accuracies of a few tenths of a meter, a clock with nanosecond accuracy over several hours is needed. This requires the clock to be stable within one part in $10^{13}$. As early chronometers helped improve navigation over the Earth's ocean, more accurate chronometers will help navigation through the solar system.

To gain increased autonomy in spacecraft operation, it is desirable to develop systems other than the operationally intensive human-controlled radar and optical position determination methods. Seeking methods that employ celestial sources, which provide positioning capabilities and do not require labor-intensive operations, remain attractive.

In order to navigate using celestial objects, precise knowledge of their positions relative to a defined reference frame at a selected time epoch is required. Catalogued ephemeris information of solar system objects provide this position information. The Sun, Moon, and planets all translate within the solar system in a reference frame viewed from the Earth. Since the orbits of the objects are Keplerian, and nearly circular, this translational motion is nearly periodic, repeating after a certain elapsed time span. It is exactly this periodicity that leads to the concept of time. The motion of these objects, or their angular displacement in their orbit, can be interpreted as a clock measuring time.

Although seemingly "fixed" with respect to a frame on the Earth, the visible spectrum stars can also provide a measurement of time and, therefore, can be interpreted as a navigational reference. In this case, however, it is the Earth or spacecraft that provides the time measurement, by rotating or translating with respect to the fixed background of stars. The extremely large distances to the stars in the Milky Way galaxy and other galaxies essentially create the illusion that the stars are fixed. Just as the solar system rotates, however, so does the Milky Way rotate and the Galaxy translates with respect to neighboring galaxies. Thus, objects are continually speeding away and towards the Earth at all times. However, the motion of the stars is so slow compared to many other measurements of time that this motion is perceived as fixed.

In addition to providing a measure of time, just as humans "triangulate" their Earth position relative to identifiable landmarks, it is conceivable to use persistent star light as markers for triangulating position. Observing known stars allows a spacecraft to initially estimate its orientation and begin a process of determining its position relative to another object. However, due to the large number of visible stars, detecting specific stars can be time-consuming due to necessary almanac database searches. Also, since there is no method of determining "when" the visible light was sent from the stars and because the stars are located so far away, determining range information from an individual star to help "triangulate" a spacecraft's position is problematic. Only during the instance of occultation, or when a known celestial body passes in front of a selected star while it is being viewed, allows a dependable method of position determination directly from star light.

However, individual stars that do have a uniquely identifiable signal, whose signals are periodic, can be utilized directly as celestial sources for navigation purposes.

Astronomical observations have revealed several classes of celestial objects that produce unique signals. A particularly unique and stable source is generated by pulsars. It is theorized that pulsars are rotating neutron stars. Neutron stars are formed when a class of stars collapse, and from conservation of angular momentum, as the stars become smaller, or more compact, they rotate faster. Neutron stars rotate with periods ranging from 1.5 ms to thousands of seconds. A unique aspect of this rotation is that for certain classes of pulsars, the rotation can be extremely stable. The most stable pulsars have stabilities on the order of $10^{-14}$ when measured on time scales of a year, which is comparable to the best terrestrial atomic clocks. No two neutron stars have been formed in exactly the same manner, thus their periodic signatures are unique. Because pulsars provide signals that are unique, periodic and extremely stable, they can assist in navigation by providing a method to triangulate position from their signals. Pulsars can be observed in the radio, optical, X-ray, and gamma-ray ranges of the electromagnetic spectrum.

Downs, in "Interplanetary Navigation Using Pulsating Radio Sources", *NASA Technical Reports,* N74-34150, Oct. 1, 1974, pp. 1–12, presented a method of navigation for orbiting spacecraft based upon radio signals from a pulsar. However, both the radio and optical signatures from pulsars have limitations that reduce their effectiveness for spacecraft missions. In order to be effective, optical pulsar-based navigation systems would require a large aperture to collect sufficient photons, since few pulsars exhibit bright optical pulsations. The large number of visible sources requires precise pointing and significant processing to detect pulsars in the presence of bright neighboring objects. This is not attractive for vehicle design. At the radio frequencies which pulsars emit (~100 MHz—few GHz) and with their faint emission, large antennae (likely 25 m in diameter or larger) would be required, which would be impractical for most spacecraft. Also, neighboring celestial objects, including the Sun, Moon, close stars, and Jupiter, as well as distant objects, such as supernova remnants, radio galaxies, quasars, and the galactic diffuse emissions are broadband radio sources that could obscure the weak pulsar radio signals, as shown by Wallace in "Radio Stars, What They Are and The Prospects for Their Use in Navigational System", *Journal of*

*Navigation,* Vol.41, September 1988, pp. 358–374. The low radio signal intensity from pulsars would require long signal integration times for an acceptable signal to noise ratio.

Chester and Butman in "Navigation Using X-Ray Pulsars", *NASA Technical Reports,* N81-27129, Jun. 15, 1981, pp. 22–25, propose the use of pulsars emitting in the X-ray band as a better option for navigation. Antennae on the order of 0.1 m$^2$ could be used for X-ray detection, which is much more reasonable than a large radio antenna. Additionally, there are fewer X-ray sources to contend with and many have unique signatures, which do not get obscured by closer celestial objects. One complicating factor is that many X-ray sources are transient in nature. The transient sources are only detectable at irregular intervals as a result of a modulation in the accretion rate onto the celestial source. The "steady" sources (such as all of the rotation-powered pulsars) would typically be used for navigation. By cataloging pulsar positions and recording their signal periodicity and identifying parameters, as well as the data from other types of pulsed celestial radiation sources, a table of candidate stars can be created for use in navigation. These catalogs can then be stored in data memory format for use by algorithm processes onboard vehicles that detect pulsed radiation signals. Maintenance of these catalogs, and timely dissemination of data updates, is required for a high performance navigation system.

SUMMARY OF THE INVENTION

The present invention provides for a system and method for navigation utilizing sources of pulsed celestial radiation. The system includes a mobile receiver for detecting signals of pulsed celestial radiation. The mobile receiver is in communication with a clock or timer for generating a timing signal corresponding to the reception of the pulses. A processing means calculates a time offset between predicted and measured time of reception of the pulsed celestial signal with respect to a chosen inertial reference frame. The processing means is further in communication with a digital memory system that stores positional data of known sources of pulsed celestial radiation. Using the position data along with the calculated time offset, the processing means can calculate navigational data for the spacecraft, satellite, planetary rover, or other vehicle upon which the mobile receiver is mounted.

It is a principal object of the subject system and method for navigation utilizing sources of pulsed celestial radiation to provide a navigational system utilizing a displaceable receiver means for detecting signals generated by a plurality of sources of pulsed celestial radiation.

It is a further objective of the subject invention to provide a timer means in communication with the displaceable receiver means for generating time of arrival signals corresponding to the time of detection of each signal.

It is a further objective of the subject invention to provide a navigation system utilizing sources of pulsed celestial radiation including a processor means for computing navigational data based upon a calculated distance between the displaceable receiver means and a reference point in a chosen inertial reference frame.

It is an important objective of the present invention to provide a navigation system including a digital memory system in communication with the processor means, the digital memory system having positional data and pulse profile characteristics of known sources of pulsed celestial radiation stored therein.

It is a further important objective of the present invention to provide a system and method for navigation utilizing sources of pulsed celestial radiation where the processing means computes navigational data of a vehicle upon which the displaceable receiver means is mounted based upon the calculated time offset and the known positional data of the celestial signal sources.

BRIEF DESCRIPTION OF THE DRAWINGS

FIG. 8*c* is a bottom view of the navigational system;

DESCRIPTION OF THE PREFERRED EMBODIMENTS

I. Overview

Figure 1:
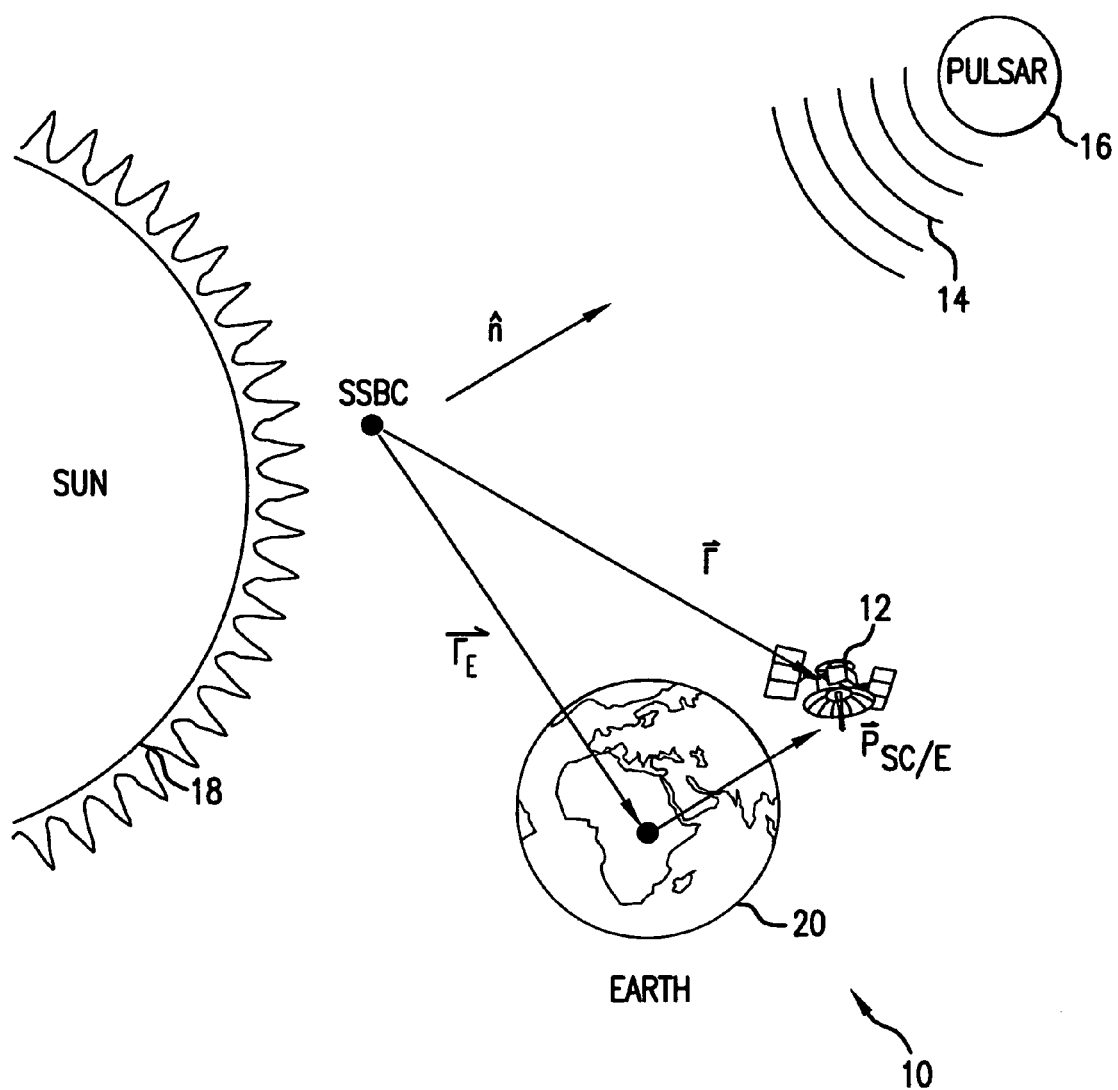
FIG. 1 is a schematic view of the subject system for navigation utilizing sources of pulsed celestial radiation.

Referring now to FIG. 1, there is shown a navigational system 10 for calculating position data of a satellite 12 or other displaceable receiving platform based upon a signal 14 generated by a celestial body 16. Although shown in FIG. 1 as a pulsar, the celestial body 16 can be any celestial body or source of a pulsed electromagnetic signal.

II. Pulsed Celestial Sources

Although Earth-based navigational systems, such as the Global Positioning System (GPS) provide navigational data including time, latitude, longitude, altitude, and attitude of a body on Earth, such systems have a limited scope of operations for vehicles moving and operating relatively far from the planet Earth. The system 10, however, utilizes celestial sources, such as pulsars, to provide a stable, predictable and unique signature signal in order to operate and navigate beyond the influence of the planet Earth.

Pulsars were initially discovered by Hewish, et al. in 1968 during a sky survey of scintillation phenomena due to inter-planetary plasma in the radio frequency range of approximately 100 MHz. Among the expected random noises emerged signals timed at regularly spaced intervals having periods of approximately one second. These periods were soon established to an accuracy of six or seven digits, making them one of the best determined astronomical constants outside the solar system. Although the exact nature of pulsars is not yet known, it is theorized that pulsars are rotating neutron stars.

A neutron star is the remnant of a massive star that has exhausted its nuclear fuel and undergone a supernova explosion. When the remaining mass of the core is between 1.4 and three times the mass of the sun, it collapses onto itself under its own gravity and a small extremely dense object is formed. This object lacks the necessary mass to become a black hole and it remains a stellar object formed largely of neutrons. Neutron stars are believed to be between 18 and 30 km in diameter. Formed with an outer crust, the neutron stars are theorized to contain a neutron superfluid. Due to conservation of angular momentum, as these objects collapse, they begin to rotate at a faster rate. The young neutron stars typically rotate with periods on the order of tens of milliseconds while older neutron stars eventually slow down having periods on the order of several seconds. A unique aspect of this rotation is that it can be extremely stable and predictable. The variance from the predicted spin rate can be as low as one part in $10^{14}$, which is comparable to the accuracy found in atomic clocks.

Neutron stars further produce immense magnetic fields. Under the influence of these strong fields, charged particles are accelerated along the field lines to extremely high energies. As these charged particles move in the pulsar's strong magnetic field, powerful beams of electromagnetic waves are radiated out from the magnetic poles of the star. If the neutron star's spin axis is not aligned with its magnetic field axis, then an observer will sense a "pulse" of high energy photons as the magnetic pole sweeps across the observer's line of sight to the pulsar. It is theorized that these neutron stars and their respective pulses form what we know as pulsars. Since no two neutron stars are formed in exactly the same manner, the pulse frequency and shape produce a unique identifying signature for each pulsar. Due to their unique pulses, pulsars can act as natural beacons, or "celestial lighthouses", on an intergalactic scale, thus allowing for their use as navigational aids, such as in system 10 of FIG. 1.

Many of the X-ray pulsars are "rotation-powered" pulsars, which are isolated neutron stars whose energy source is the stored rotational kinetic energy of the star itself. In addition to these rotation-powered pulsars, two other types of pulsars exist: "accretion-powered" pulsars and "anomalous pulsars". Accretion-powered pulsars are neutron stars in binary systems where material is being transferred from the companion star onto the neutron star. This flow of material is channeled by the magnetic field of the neutron star onto the poles of the star, which creates hot spots on the star's surface. The pulses are a result of the changing viewing angle of these hot spots as the neutron star rotates. These accreting pulsars are often subdivided into those with a high mass (typically 10–30 solar masses) or low mass (typically less than one solar mass) companions. The anomalous X-ray pulsars are powered by the decay of their immense magnetic fields (approximately $10^{14}$–$10^{15}$ Gauss).

In addition to pulsars, such as pulsar 16 shown in FIG. 1, other variable pulsed celestial objects exist and can be used for spacecraft navigation. Many of these objects are highly variable in intensity and often employ different energy sources for their X-ray emissions. Such sources include active galactic nuclei, algol type stars, atoll sources, binary variable stars, black hole candidates, bursters, coronal sources, cataclysmic variables, galaxy clusters, galactic ridge emissions, globular clusters, soft gamma repeaters, supernova remnants, white dwarf stars, and Z sources. Although these alternate X-ray sources have some desirable characteristics for use in navigation, some do not have detectable periodic or variable pulsations and others introduce additional complexities for signal processing and time-of-arrival determination. Whereas pulsars have reduced complexity, and are thus preferred as navigation beacon sources, all sources that produce predictable variable patterns can be implemented into the spacecraft navigation scheme.

Although nearly all rotation-powered pulsars are constant in intensity, the accreting pulsars and most other X-ray source classes often exhibit highly aperiodic variability in intensity that limits their usefulness for precise time and position determination. Additionally, many are unsteady, or "transient", sources with a large range of duty cycles. Sources with X-ray flares of significant magnitude are also occasionally detected, which are high intensity signals lasting for short periods. Since neutron stars contain a solid crust and a super fluid interior, exchanges of angular momentum between the two materials can cause unpredictable "star-quakes", or "glitches", which can significantly vary the spin rates of the stars. A navigational system that utilizes pulsars would have to address the transient, flaring, and glitch aspects of these sources. Additionally, as the diffuse X-ray background would be present in all observations, a navigation system that utilizes pulsed X-ray celestial sources must address the presence of this background noise in its data processing.

Although many pulsars radiate at radio, optical, X-ray and gamma-ray wavelengths, not all have this feature. As X-ray and gamma-rays are difficult to detect on the ground due to the absorption of these wavelengths by Earth's atmosphere, detection within these bands requires observation to be made above the atmosphere. This complicates the detection and parameter verification of X-ray sources. Additionally, many X-ray sources are faint and require sensitive instruments to detect.

Unlike human-made systems, such as the GPS, the distances to X-ray sources are not known to an accuracy that would allow them to be utilized as a ranging mechanism. However, the Galactic latitude and longitude of the X-ray sources can be determined with high precision. Most sources are located within our Galaxy, but still are very far from our solar system. Also, with many sources located within the Milky Way galactic plane, there are a limited number of bright sources that could provide off-axis triangulation for position determination.

III. X-Ray Source Observations

Since the discovery of the first non-solar cosmic X-ray source, numerous balloon, rocket, and satellite borne instruments have surveyed the sky. Table 1 provides a list of X-ray source survey missions. Different X-ray missions have observed the X-ray sky in various energy ranges, depending on instrument characteristics or mission goals.

TABLE 1

| Mission Name | Mission Operation | Energy Range (keV) |
| --- | --- | --- |
| Vela 5B | 1969–1979 | 3–750 |
| UHURU | 1970–1973 | 2–20 |
| OSO-7 | 1971–1974 | 1–10,000 |
| Skylab | 1973–1979 | 0.1–0.3 |
| ANS | 1974–1977 | 0.1–30 |
| Ariel V | 1974–1980 | 03.–40 |
| OSO-8 | 1975–1978 | 0.15–1000 |
| SAS-3 | 1975–1979 | 0.1–60 |
| HEAO | 1977–1979 | 0.2–10,000 |
| Einstein | 1978–1981 | 0.2–20 |
| Hakucho | 1979–1985 | 0.1–100 |
| Tenma | 1983–1984 | 0.1–60 |

TABLE 1-continued

| Mission Name | Mission Operation | Energy Range (keV) |
|---|---|---|
| EXOSAT | 1983–1986 | 0.05–20 |
| Ginga | 1987–1991 | 1–400 |
| Granat | 1989–1998 | 2–100,000 |
| ROSAT | 1990–1999 | 0.1–2.5 |
| ASCA | 1993–2001 | 0.4–10 |
| DXS | 1993 | 0.15–0.28 |
| RXTE | 1995–Present | 2–250 |
| BeppoSAX | 1996–2002 | 0.1–300 |
| USA | 1999–2000 | 1–15 |
| XMM | 1999–Present | 0.1–15 |
| Chandra | 1999–Present | 0.1–10 |

During the late 1970's, the HEAO mission detected 842 X-ray sources within the 0.2–10 keV range. The German X-ray observatory ROSAT completed the latest comprehensive all-sky survey of the X-ray sky in the year 2000. This mission has detected 18,806 bright sources (above 0.05 X-ray photon counts per second in the 0.1–2.4 keV range), and detected a significant number of sources (105,924 objects) in its faint all-sky X-ray survey.

The Australia Telescope National Facility has recently completed the most comprehensive radio pulsar study to date in their Parkes Multibeam Pulsar Survey. This survey has increased the number of known radio pulsars from 558 to over 1,400. Many of these newly detected radio pulsars most likely radiate in the X-ray band, which adds to the number of potential pulsar navigation sources. By comparing various catalogs and published works, celestial sources can be investigated for their potential use in navigation systems.

X-ray sources exist throughout the sky. Distances to X-ray objects in our Galaxy range from several parsecs to thousands of parsecs (1 parsec=3.262 light years=3.086×10$^{16}$ m.). Most of the rotation-powered pulsars are detected within the Galaxy, with the rest being in the Magellenic Clouds. Magnetic fields of these objects range from several thousand to 10$^{14}$ Gauss (by comparison, the Sun's magnetic field is a few tens Gauss in magnitude). Pulse periods range from between 0.0016 to 0.53 seconds for the rotation-powered pulsars, and from 0.034 to 10,000 seconds for accretion-powered pulsars.

Figure 2:
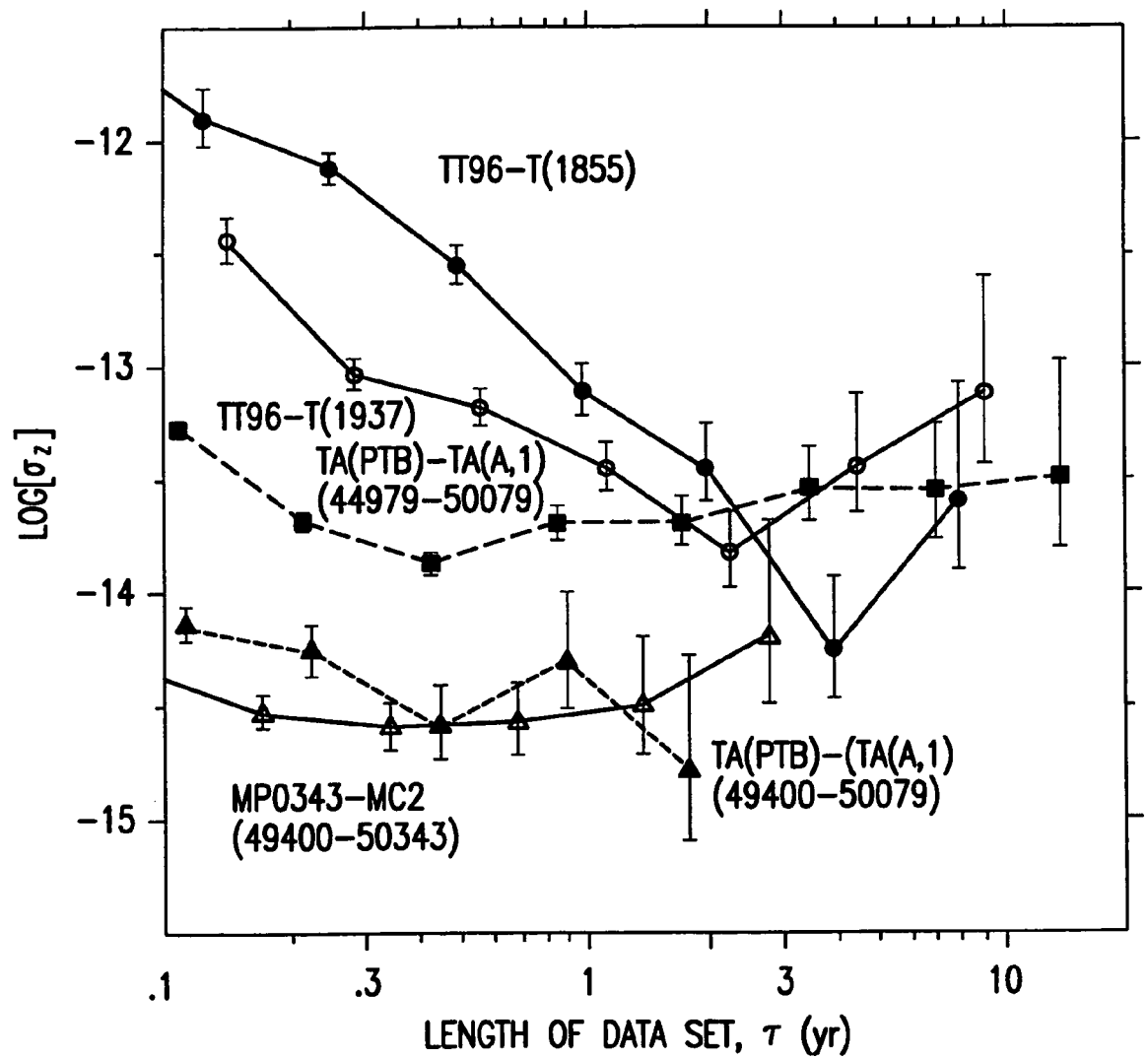
FIG. 2 is a data plot illustrating the stability of several atomic clocks.
Figure 3:
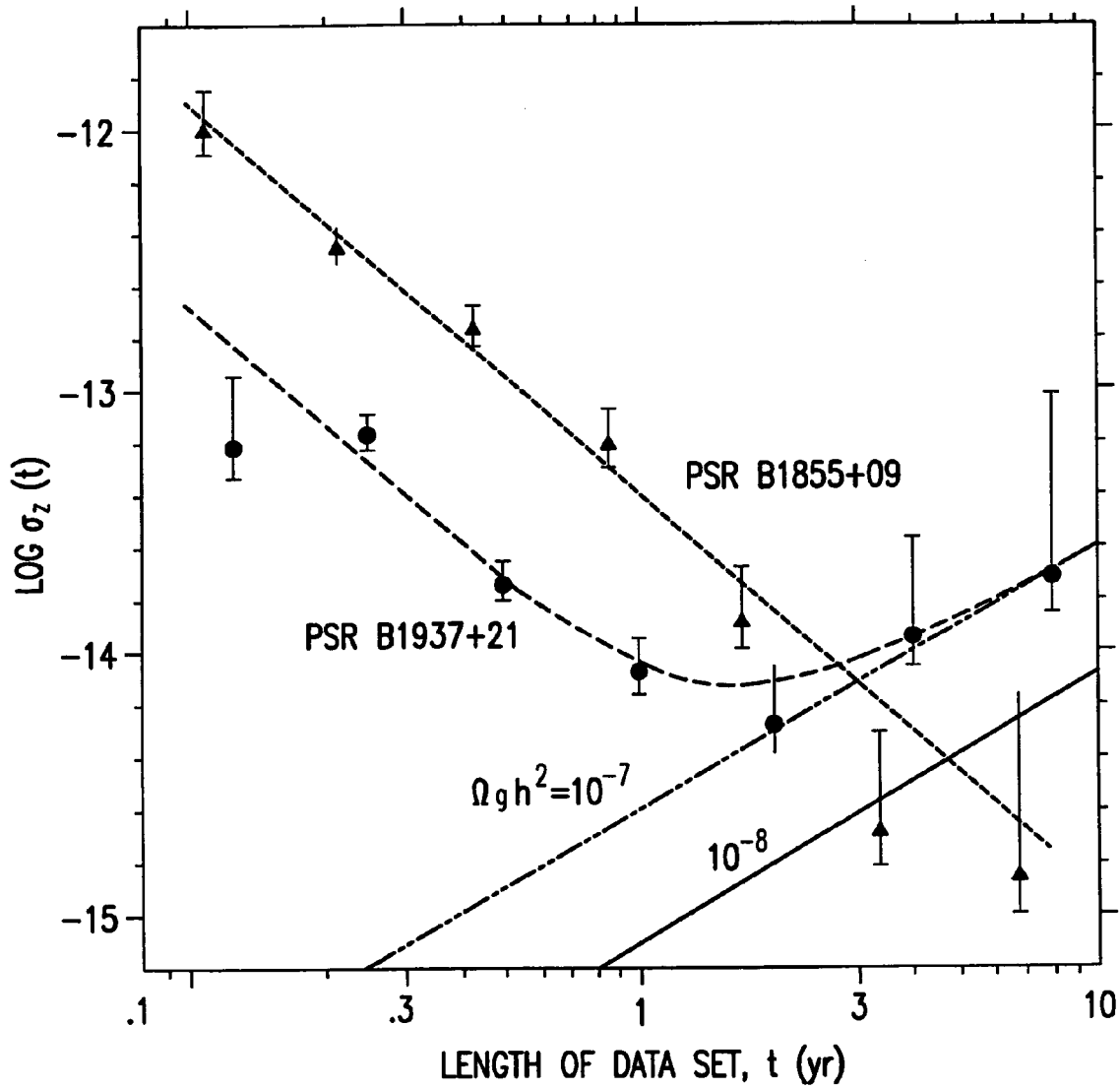
FIG. 3 is a data plot illustrating the time stability of two millisecond pulsars.

As some pulsars have been observed for several decades, it has been shown that the stability of their spin rates compares well to the quality of today's atomic clocks. FIGS. 2 and 3 provide comparison plots of the stability of atomic clocks and several pulsars measured in a third-order Allan Variance. The data for the plot of FIG. 2 comes from D. N. Matsakis, J. H. Taylor, and T. Marshall Eubanks, "A Statistic for Describing Pulsar and Clock Stabilities", *Astronomy and Astrophysics*, Vol. 326, 1997, pg. 924–928. The data for the plot in FIG. 3 comes from V. M. Kaspi, J. H. Taylor, and M. F. Ryba, "High-Precision Timing of Millisecond Pulsars. III. Long-Term Monitoring of PSRs B1855+09 and B1937+21", *Astrophysical Journal*, Vol. 428, June 1994, pg. 713–728.

An accurate clock is a fundamental component in a spacecraft navigational system. On-board clocks provide a reference for a vehicle's process timer and for comparison to other time systems, and are critical for on-board systems such as communications. Atomic clocks provide high accuracy references and are typically good to within one part in 10$^9$–10$^{15}$ over a day. In order to track the motion of radio signals at accuracies of a few tenths of a meter, a clock with nanosecond accuracy over several hours is needed. This requires the clock to be stable to within one part in 10$^{13}$.

FIG. 3 illustrates that several pulsars meet the stability requirement. Older pulsars, particularly those that have undergone a long period of accretion in a binary system that spins them up to a millisecond period (the so-called "recycled pulsars") have extremely stable and predictable rotation rates.

IV. Pulse Profiles and Arrival Times

Source pulse profiles vary in amplitude, duration, number of peaks, and stability depending upon the nature of the pulsar. This uniqueness can aid in the identification of an individual source. Typically, standard profile templates are created by observing a source over long durations and "folding", or synchronously averaging, at the pulse period. This folding process produces a pulse profile with a very high signal-to-noise ratio, and using this standard profile, characteristics of the pulse can then be determined, such as period length, amplitude and variability.

Figure 4:
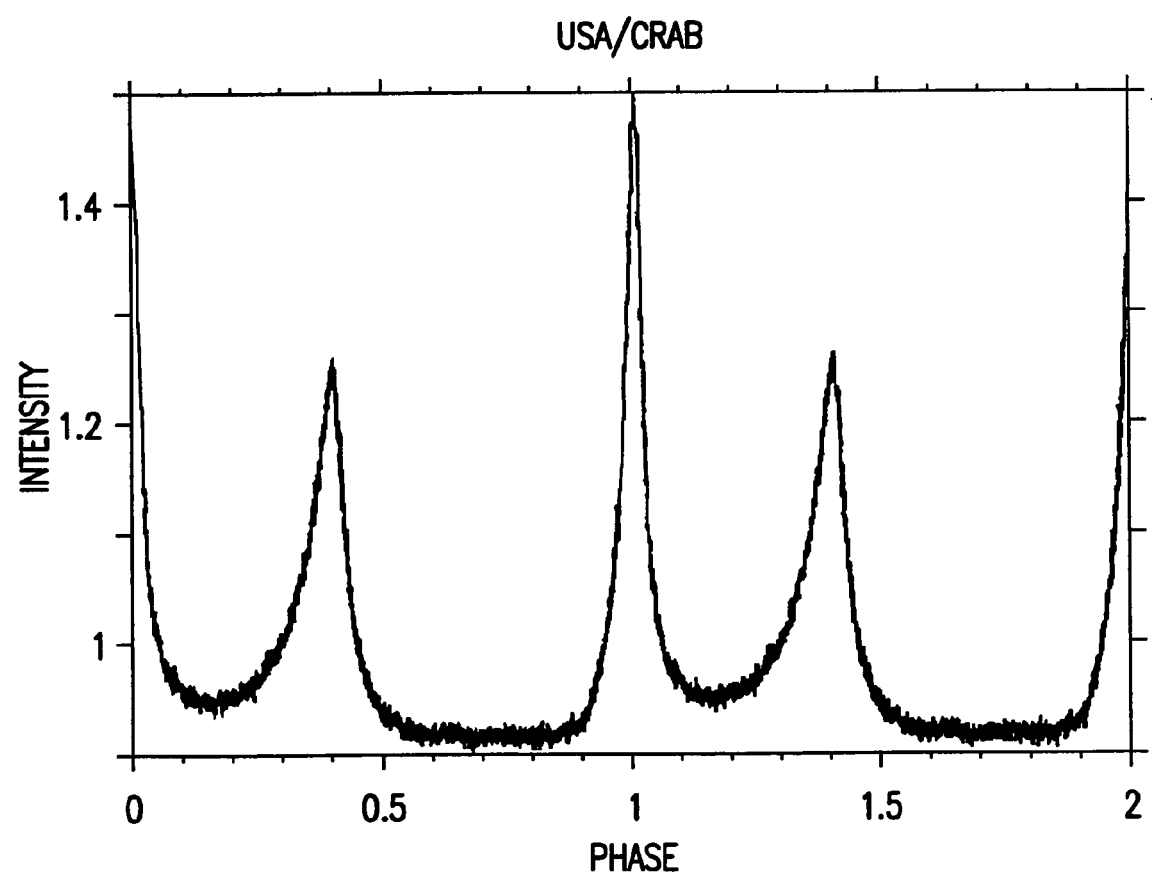
FIG. 4 is a data plot illustrating measured signal intensity generated by a sample pulsar.
Figure 5:
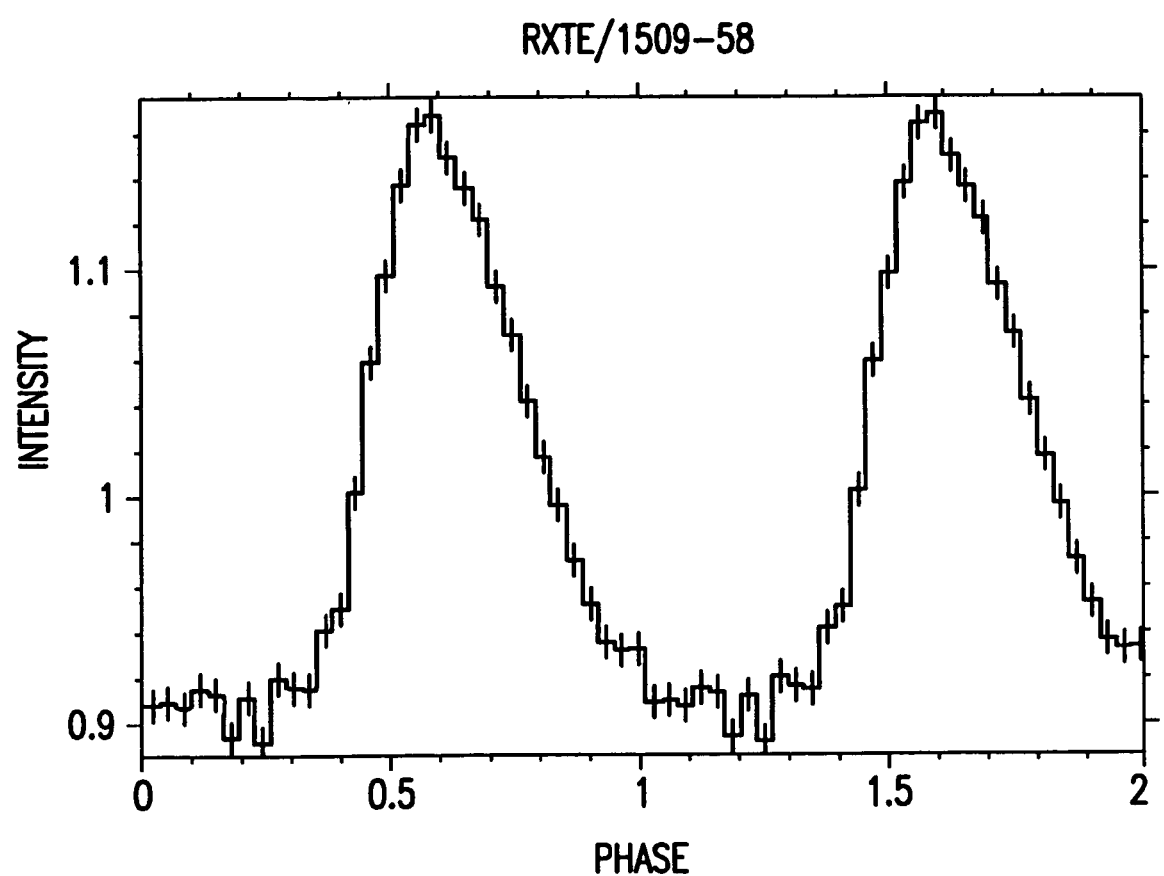
FIG. 5 is a data plot illustrating measured intensity generated by a second known pulsar.

FIG. 4 illustrates an image of a standard template for the Crab Pulsar (PSR B0531+21) in the X-ray band (2–10 keV). The intensity of the profile is a ratio of count rate relative to average count rate. This image shows two cycles of the pulse, with one main pulse and a secondary pulse at a lower amplitude. The period of this pulse is approximately 33.4 milliseconds (Epoch 48743.0 MJD) and several period derivatives have been detected. FIG. 5 shows an image of the pulse profile of PSRB1509–58. Two cycles are also shown for this pulsar, with a pulse period of approximately 150.23 milliseconds (Epoch 48355.0 MJD).

Pulsars are timed by comparing measured pulse time of arrival (TOA) with those predicted by a model. A TOA measurement is made by observing a pulsar for a short period of time and producing a folded profile. The observed profile will differ from the standard profile template, s(t), by several factors. Typically, the observed pulse will vary by a bias, b, a scale factor, k, and some random noise η(t), which in the case of X-ray observations is typically dominated by Poisson counting statistics. The relationship between the observed pulse p(t) and the standard template is given by:

$$p(t)=b+k \cdot s(t-\tau)+\eta(t) \qquad (1)$$

where τ is the time offset between the two profiles that are to be measured. The TOA determination process consists of Fourier transforming the observed and standard profiles and minimizing the fitting values to compute the bias, scale factor, and TOA. The TOA determination process is described in further detail below. Additionally, depending on the chosen reference time for a specific navigation system application, the time measured by the clock 24 may need to be referenced to a terrestrial time standard, such as Coordinated Universal Time (UTC), or Temps Atomique International (TAI International Atomic Time) and the necessary time corrections are added accordingly.

V. Measurement of TOA

Figure 10:
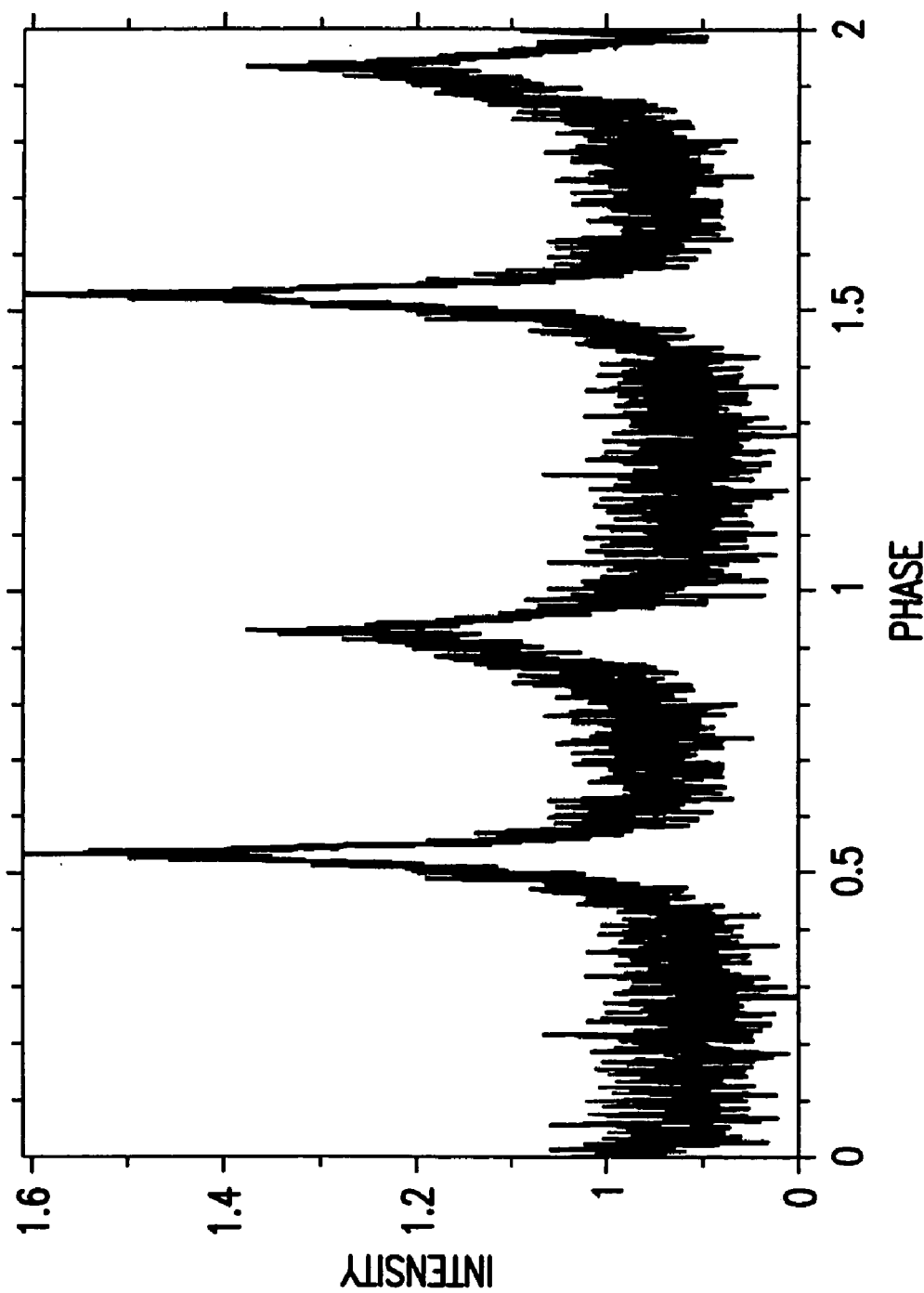
FIG. 10 is a plot showing the measured pulse profile from a short observation of the Crab Pulsar; and, FIG. 11 is a schematic view of an alternative embodiment of the subject system for navigation utilizing sources of pulsed celestial radiation.

The fundamental measurable quantity of a pulsar-based navigation system is the time of arrival (TOA) of a pulse at the detector 22 as referenced to the clock 24. The detector 22 records the time of each individual X-ray photon with respect to the clock 24 to some high precision, on the order of one microsecond or better. Let the recorded time of the nth photon be $t_n$. During a total integration time, T, a large number of photons N will have their arrival time measured by the clock 24 and recorded. Individual photon arrival times from $t_0$ to $t_N$ are then converted to their equivalent time as the SSBC, as described in Section VII below, and "folded" at the predicted pulse period of the pulsar based on the timing model for the pulsar. A binned pulse profile is then constructed by dividing the pulse phase into M equal bins and dropping each of the N photons into the appropriate phase bin. Such a measured profile is illustrated in FIG. 10.

The TOA is then determined by measuring the offset between the phase of the measured profile with respect to the high signal-to-noise standard profile template for that source. This is based on the assumption that, after averaging a sufficiently large number of pulses, a pulse profile recorded in the same energy range is invariant with time. Thus, the phase zero point on the template profile sets the definition of phase zero for that source. The template can be aligned with an arbitrary point in the profile as phase zero, but two conventions are commonly used. Either the peak of the main pulse can be aligned as phase zero, or the profile can be aligned such that the phase of the fundamental component of its Fourier transform is zero. The latter method is preferred (which reduces to the former in the case of a single-symmetric pulse profile) because it is more precise and generally applicable, and allows for easy construction of standard templates by measuring the phase of the fundamental Fourier component and then applying a fractional phase shift to the profile.

It is important to determine the TOA with an accuracy that is determined by the signal-to-noise ratio of the profile, and not by the choice of the bin size. A standard cross-correlation analysis does not allow this to be easily achieved. However, the method given by J. H. Taylor, "Pulsar Timing and Relativistic Gravity", *Philosophical Transaction of Royal Society (London A)*, Vol. 341, 1992, pp. 117–134, is independent of bin size and can be implemented into the navigation system. The technique employs the time shifting property of Fourier transform pairs.

The Fourier transform of a function shifted by an amount $\tau$ is the Fourier transform of the original function multiplied by a phase factor of $e^{2\pi i f \tau}$. Since the measured profile differs from the template by a time shift and a scale factor plus random noise, as in Eq. (1), it is straightforward to transform both the profile and the template into the Fourier domain. The parameters in Eq. (1) are then easily determined by a standard least-squares fitting method. The final measured TOA of the pulse is then determined by adding the fitted offset $\tau$ to the recorded start time of the integration, $t_0$.

VI. Pulse Phase Timing Models

In order to predict when pulses are expected to arrive at an observing station, a pulsar phase timing model must be developed. In order to compute accurate arrival times of pulses, measurements must be made relative to an inertial frame; i.e., a frame unaccelerated with respect to the pulsars. As most observations are typically made on the Earth, or in a spacecraft moving about the Earth, such as satellite 12 shown in FIG. 1, this data collected while in a moving frame must be transferred to an inertial frame. General relativity theory provides a means of transferring this data to an inertial frame, and these equations relate the emission time of photons that emanate from a source as the photons travel through curved space-time to the arrival at a station.

The parameterized post-Newtonian (PPN) frame provides one option of an inertial frame and a reference time for accurate pulse timing. Several astronomical observatories use the PPN frame. Additionally, a frame exists that simplifies some of the general relativistic equations. This frame, the Temps Dynamique Baricentrique (TDB-Barycentric Dynamical Time), has its origin at the solar system barycenter (SSBC). This origin is just outside the surface of the Sun, as shown in FIG. 1, and is the center of mass of the solar system. FIG. 1 shows the relationships of pulses 14 from pulsars to the inertial TDB frame and to a spacecraft 12 orbiting the Earth 20. The positions of the spacecraft 12 and the center of the Earth 20 relative to the SSBC are shown. Earth-based telescopes or Earth-orbiting spacecraft can initially use terrestrial time standards to reference their observation. Then a transformation, derived below, can be utilized to convert from terrestrial time to TDB time.

The phase, $\phi$, of arriving pulses can be detected at the SSBC using a pulsar-phase model given by $$\phi(t) = \phi(T_0) + \omega(t - T_0) + \frac{1}{2}\dot{\omega}(t - T_0)^2 + \frac{1}{6}\ddot{\omega}(t - T_0)^3 \qquad (2)$$

known as the "pulsar spin equation", or "pulsar spin down law", where t is the time of observation, $T_0$ is the reference epoch, and $\omega$, $\dot{\omega}$, $\ddot{\omega}$ are the pulse frequency and its derivatives. This equation can also be represented using period, P, (also angular velocity $\Omega = 2\pi\omega$) using the following relationships, $$\omega = \frac{1}{P}; \qquad P = \frac{1}{\omega} \qquad (3)$$

$$\dot{\omega} = -\frac{\dot{P}}{P^2}; \qquad \dot{P} = -\frac{\dot{\omega}}{\omega^2}$$

$$\ddot{\omega} = \frac{2\dot{P}^2}{P^3} - \frac{\ddot{P}}{P^2}; \qquad \ddot{P} = \frac{2\dot{\omega}^2}{\omega^3} - \frac{\ddot{\omega}}{\omega^2}$$

to produce $$\phi(t) = \phi(T_0) + \frac{1}{P}(t - T_0) - \frac{\dot{P}}{2P^2}(t - T_0)^2 + \left(\frac{\dot{P}^2}{3P^3} - \frac{\ddot{P}}{6P^2}\right)(t - T_0)^3 \qquad (4)$$

Eq. (4) allows the determination of the phase of a pulse signal at a future time t, relative to a reference epoch $T_0$. Thus, at time t, it is possible to predict when the peak amplitude of the pulsar signal is expected to arrive at the SSBC. However, as no detectors exist at the SSBC, observation corrections must be made to allow Eq. (4) to be used for predicting pulsar pulse arrivals at the actual detector location. The model shown in Eq. (4) utilizes periods and its first two derivatives, however, any number of derivatives can be used depending on what is required to model a particular pulsar's timing behavior. Many more parameters may be required for some pulsars, such as those in binary systems. The accuracy of the model prediction depends on the quality of the known timing model parameters and on the intrinsic noise of the pulsar rotation.

VII. Reference Origin Offset Correction

Figure 6:
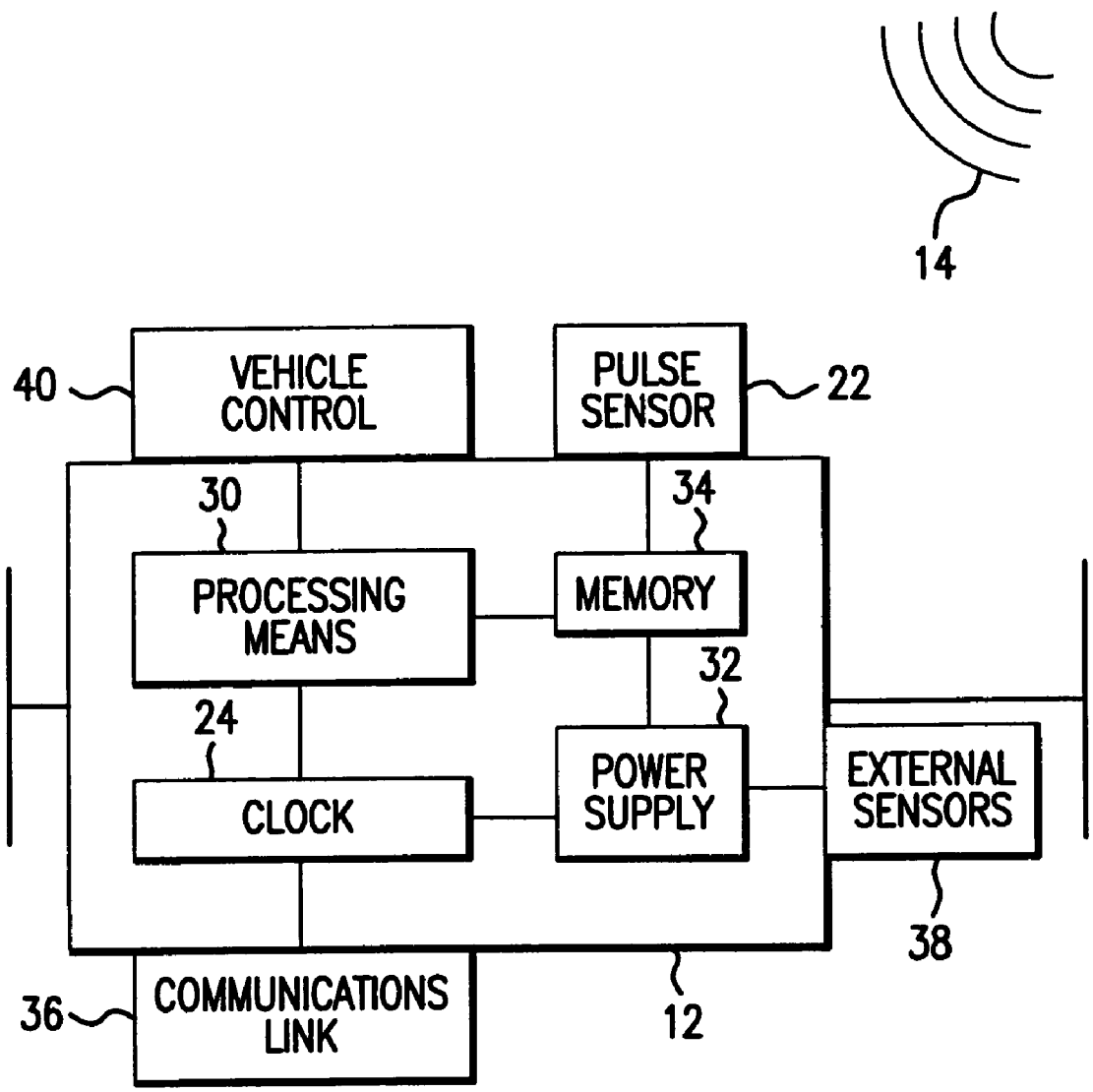
FIG. 6 is a schematic view of the navigational system mounted on a spacecraft.

In order to adequately model pulsar signals, an inertial frame must be chosen for signal timing, and the SSBC can be utilized. A navigation system on a spacecraft, such as spacecraft 12, would be comprised of a sensor that would detect pulsar signals at the spacecraft location and a clock that would time these signals relative to a terrestrial time standard. FIG. 6 illustrates spacecraft 12 of FIG. 1 receiving the pulses 14 generated by pulsar 16. A pulse sensor 22 is mounted on spacecraft 12, as is a clock 24. If the spacecraft position and velocity are known, then pulse arrival time at the spacecraft can be transferred to the SSBC and compared to Eq. (4).

From FIG. 1, it can be seen that from a spacecraft's position $\vec{r}$ relative to the SSBC at time t, the offset of time a pulsar signal arrives at a spacecraft compared to its arrival at the SSBC to first order is, $$t_b - t_{obs} = \Delta t = \frac{\hat{n} \cdot \vec{r}}{c} \tag{5}$$

where $t_b$ is the time of pulse arrival at the SSBC, the $t_{obs}$ is the time of observation at the spacecraft, $\hat{n}$ is the unit direction from the origin to the pulsar, and c is the speed of light. Since many pulsars are so distant from the Earth, the unit direction to the pulsars can be considered constant throughout the solar system. Closer pulsars must include the pulsar's motion effects and user position when determining their unit direction. The time used in Eq. (5) is referred to as coordinate time, or the time measured by a standard clock at rest in the inertial frame. A spacecraft's clock, unless actually at rest (zero-velocity) with respect to the SSBC and at the same gravitational potential, does not measure coordinate time. A spacecraft's clock measures proper time, or the time a clock measures as it travels along a four-dimensional space-time path. The goal of a pulsar-based navigation system would be in part to provide accurate position information of the spacecraft. This could only be accomplished by accurately timing pulsar signals and then correctly transferring this time to the SSBC. If a performance goal of such a navigation system is to provide accurate position information on the order the less than 300 meters, then the system must accurately time pulses to at least less than 1 µs (≈300/c). To achieve these types of accuracies, general and special relativistic effects on a clock in motion relative to an inertial frame and within a gravitational potential field must be considered. A derivation of these effects on time is provided below.

The four dimensions of the space-time coordinate frame can be generalized to $$\{ct, x, y, z\} = \{x^0, x^1, x^2, x^3\} \tag{6}$$

with ct representing the dimension related to time, and $\{x,y,z\}$ representing the spatial coordinates. A scalar metric, $ds^2$, can be created which is invariant with respect to arbitrary transformations of coordinate. This can be defined as $$ds^2 = g_{\alpha\beta} dx^\alpha dx^\beta \tag{7}$$

where $g_{\alpha\beta} = g_{\alpha\beta}(ct,x,y,z)$ is a function of time and spatial coordinates and the elements of $g_{\alpha\beta}$ form a symmetric, covariant tensor, and the $dx^i$ terms define the space-time path of an object. The path taken by a light ray or particle in space-time is called a world line. The proper time measured by a clock, τ, as the clock moves along a world line in space-time frame, is related to the scalar invariant via $$d\tau = \frac{|ds|}{c} \text{ or} \tag{8a}$$

$$d\tau^2 = -\frac{ds^2}{c^2} \tag{8b}$$

From special relativity, the metric tensor can be written in Cartesian, flat-space (absence of gravity) as $$ds^2 = -c^2 dt^2 + (dx^2 + dy^2 + dz^2) \tag{9}$$

From general relativity in a weak-gravitational field and nearly flat space, this metric has been shown of the order O(1/c) to be, $$ds^2 = -\left(1 - \frac{2U}{c^2}\right) c^2 dt^2 + (dx^2 + dy^2 + dz^2) \tag{10}$$

where U is the total gravitational potential acting on the spacecraft clock. Using the spatial velocity term of $$v^2 = \left(\frac{dx}{dt}\right)^2 + \left(\frac{dy}{dt}\right)^2 + \left(\frac{dz}{dt}\right)^2 \tag{11}$$

which represents the speed of the spacecraft's local frame through the solar system, Eq. (10) can be divided by $dt^2$ to yield, $$\left(\frac{ds}{dt}\right)^2 = -\left(1 - \frac{2U}{c^2}\right) c^2 + v^2 \tag{12}$$

Using Eq. (8b) and taking the square root, Eq. (12) becomes, $$\left(\frac{d\tau}{dt}\right) = \left[1 - \frac{2U}{c^2} - \left(\frac{v^2}{c^2}\right)\right]^{\frac{1}{2}} \tag{13}$$

Using Taylor-series expansion on Eq. (13) and keeping only the terms of order $O(1/c^2)$ yields, $$d\tau = \left[1 - \frac{U}{c^2} - \frac{1}{2}\left(\frac{v}{c}\right)^2\right] dt \tag{14}$$

with a maximum error of $10^{-12}$ s.

By integrating Eq. (14) a solution of the proper time relative to the coordinate time can be determined for a spacecraft clock.

Integrating Eq. (14) over time yields, $$\int_{\tau_0}^{\tau} d\tau = \tag{15}$$

$$(\tau - \tau_0) = \int_{t_0}^{t} \left[1 - \frac{U}{c^2} - \frac{1}{2}\left(\frac{v}{c}\right)^2\right] dt = (t - t_0) - \int_{t_0}^{t} \left[\frac{U}{c^2} + \frac{1}{2}\left(\frac{v}{c}\right)^2\right] dt$$

For an earth-orbiting spacecraft, the velocity of the spacecraft's clock can be related to the earth coordinate frame to express v as, $$v^2 = (\vec{v}_E + \vec{\rho}_{SCIE}) \cdot (\vec{v}_E + \vec{\rho}_{SCIE}) \tag{16}$$

where $\vec{v}_E$ is the velocity of the Earth in the SSBC frame, an $\vec{\rho}_{SCIE}$ is the spacecraft's velocity with respect to the Earth in the SSBC frame. Expanding Eq. (16) and ignoring small terms, Eq. (15) can be rewritten as, $$(t - t_0) = (\tau - \tau_0) + \int_{t_0}^{t} \left[ \frac{U}{c^2} + \frac{1}{2}\left(\frac{v_E}{c}\right)^2 \right] dt + \frac{1}{c^2}(\vec{v}_E \cdot \vec{p}_{SC/E}) \quad (17)$$

where $v_E = \|\vec{v}_E\|$. The third term on the right-hand side is often referred to as the Sagnac effect. Using the following representation of pulsar position:

$$\vec{D} = \vec{D}_0 + \vec{V}_0(T - T_0) \quad (18)$$

where $\vec{D}_0$ is assumed to be the position at a fudicial time, $T_0$, we can arrive at a solution for the second term on the right-hand side of Eq. (17). This model of pulsar motion assumes a constant velocity, $\vec{V}_0$, referred to as "proper-motion" of the pulsar, which includes radial and transverse speed terms. Using the additional assumptions that pulsars are very far away from the spacecraft such that $\vec{D}_0 \gg \vec{V}_0(T-T_0)$, and that the direction to the pulsar is $\hat{n} \approx \vec{D}_0 / \|\vec{D}_0\|$, the solution becomes, $$(t - t_0) = (\tau - \tau_0) + (T - T_0) - \frac{1}{c}\left[(\hat{n} \cdot \vec{V}_0)\Delta t - (\hat{n} \cdot \vec{r})\right] -$$

$$\frac{1}{2c\|\vec{D}_0\|}\left[\|\vec{r}\|^2 - (\hat{n} \cdot \vec{r})^2\right] + \frac{1}{c\|\vec{D}_0\|}\left[(\vec{V}_0 \cdot \vec{r}) - (\hat{n} \cdot \vec{V}_0)(\hat{n} \cdot \vec{r})\right]\Delta t -$$

$$\frac{1}{2c\|\vec{D}_0\|}\left[\|\vec{V}_0\|^2 - (\hat{n} \cdot \vec{V}_0)^2\right]\Delta t^2 +$$

$$(1+\gamma)\sum_j \frac{GM_j}{c^3}[\ln|(\hat{n} \cdot \vec{r}_j) + \|\vec{r}_j\||] + \frac{1}{c^2}(\vec{v}_E \cdot \vec{p}_{SC/E}) \quad (19)$$

where $r_j$ is the position of the spacecraft relative to the jth planetary body in the solar system, and $\gamma$ is the time dilation factor. Since the values of $\vec{V}_0$ are small, the Sun imposes the primary gravitational field within the solar system, and $\gamma$ can be set equal to one, the expression Eq. (19) can be further simplified as, $$(t - t_0) - (T - T_0) = (\tau - \tau_0) + \frac{\hat{n} \cdot \vec{r}}{c} -$$

$$\frac{1}{2c\|\vec{D}_0\|}[\|\vec{r}\|^2 - (\hat{n} \cdot \vec{r})^2] + \frac{2\mu_s}{c^3}[\ln|(\hat{n} \cdot \vec{r}) + \|\vec{r}\||] + \frac{1}{c^2}(\vec{v}_E \cdot \vec{p}_{SC/E}) \quad (20)$$

where $\mu_s = GM_s$ is the gravitational parameter of the Sun. Setting the left-hand side to be the change in time measured at the SSBC, Eq. (20) may be written as, $$\Delta t_b = \Delta \tau + \frac{\hat{n} \cdot \vec{r}}{c} - \frac{1}{2c\|\vec{D}_0\|}[\|\vec{r}\|^2 - (\hat{n} \cdot \vec{r}^2)] +$$

$$\frac{2\mu_s}{c^3}[\ln|(\hat{n} \cdot \vec{r}) + \|\vec{r}\||] + \frac{1}{c^2}(\vec{v}_E \cdot \vec{p}_{SC/E}) \quad (21)$$

The second term on the right-hand side of Eq. (21) is the first order Doppler delay, and the third term is due to the effects of annual parallax. Together these two terms are referred to as Roemer delay. The fourth term is the Sun's Shapiro delay, and the fifth term is the relativistic effects of a portable clock in motion relative to the SSBC. With the addition of the fifth term, this equation matches well with those used by Earth-based pulsar timing observations. The interstellar medium dispersion measure term, appearing as a correction for radio observations, is considered zero in Eq. (21) for high frequency X-ray radiation.

Given a measurement of a pulse arrival by the spacecraft's clock, the measured time, $\tau$, must have its own reference time (for example, UTC or TAI) converted to TDB, then Eq. (21) can be used to determine the arrival time of that same pulse at the SSBC. Eq. (4) can be further utilized for a comparison of predicted and detected arrival times. Eq. (21) requires accurate ephemeris information to provide the SSBC location, the Sun's gravitational parameters, and the velocity of the Earth. It is intended for spacecraft in orbit about the Earth, and extensions to interplanetary spacecraft can be made through a similar derivation.

VIII. Time Determination and Correction Method

If accurate spacecraft position is known, Eq. (21) can be used to determine the expected arrival time of the pulse at the SSBC. If a spacecraft clock is in error, then the offset of the measured arrival time to the expected arrival time provides a measure of this clock error.

Assume a spacecraft clock can be represented by the following, $$\tau_T = \tau_C + b + k(\tau_C - \tau_0) + \frac{1}{2}j(\tau_C - \tau_0)^2 + \eta(\tau_C) \quad (22)$$

where $\tau_T$ is the true time, $\tau_C$ is the measured time from the clock, $\tau_0$ is a reference time, b the clock bias, k is the clock rate, j is the clock jitter, and $\eta$ is the noise within the clock. Given estimates of b, k, and j, a Kalman filter can be created using this clock model. The measurement to this filter would be the offset between the estimated clock error and the computed clock error, $$d\tilde{\tau} = \tau_T - \tau_C \approx b + k(\tau_C - \tau_0) + \frac{1}{2}j(\tau_C - \tau_0)^2 \quad (23)$$

$$d\tau = \tau_P - \tau_C \quad (24)$$

where $\tau_P$ is the pulse arrival time from Eqs. (4) and (21). The frequency of the pulsar signal is used to stabilize a local clock using this filter.

IX. Celestial Object Occulation Position Determination Method

In the Earth-Limb occultation method, a detector is pointed towards the Earth's limb. As the vehicle revolves around the Earth in it's orbit, X-ray sources move behind the limb and then reappear on the other side. The time spent behind the Earth represents a chord length of the Earth's disk. Knowing the source position and the Earth's dimensions, it is possible to determine the position of the vehicle relative to the Earth. Knowledge of the Earth's atmosphere is required, since the X-ray signals would begin to be absorbed by the atmosphere as the source passes close to the limb.

Although this occultation method is described using the Earth's limb, any celestial body can be utilized in this concept. Bodies with known dimensional characteristics and positional ephemeredes are good candidates for this method, as long as they occult the path of a viewed X-ray source. Although we refer to X-ray sources, it is well understood that sources of any celestial radiation may be used.

X. Position Estimator Method

Due to the unique signatures of pulsars, it is possible to determine the position of a spacecraft, such as spacecraft 12 in FIG. 1. The position is determined relative to a desired inertial reference frame. Although the SSBC, shown in FIG. 1, provides one such frame, it is often more useful for mission operations to also relate vehicle position to the Earth's position. The occultation method described above and the position estimator and cold-start processes described below are methods of position determination relative to the Earth. Methods for determining the position of a spacecraft on interplanetary missions can be extended from these Earth-based examples.

In a "position estimator" method, pulsar signals received at a spacecraft are offset from those arriving at the SSBC primarily by the distance between the SSBC and the spacecraft, as in Eq. (5). Conversely, if the time offset can be directly measured, then the position offset can be computed. A pulsar's individual pulses arrive at the SSBC as per the model defined in Eq. (4). This equation allows the determination of when the kth pulse will arrive at the SSBC relative to a chosen reference $T_0$. As it moves away from the SSBC, a spacecraft sensor will detect a pulse at a time relative to $T_0$ based upon Eq. (21). However, if the spacecraft position is not known, then Eq. (21) cannot be used to transform spacecraft time to the SSBC. Pulses can still be detected and timed, but only relative to the spacecraft itself.

Figure 7:
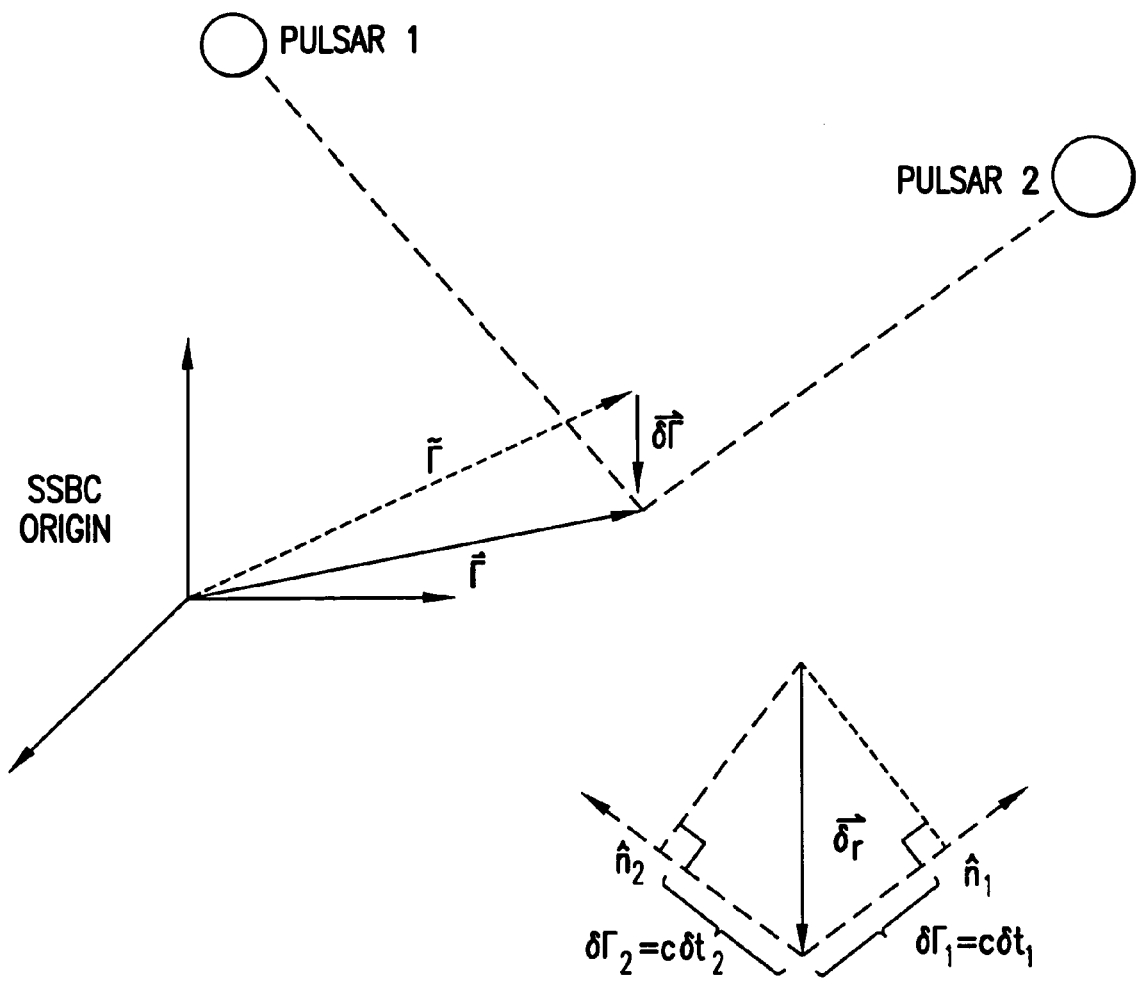
FIG. 7 is a schematic illustration of the geometrical calculations carried out by the navigational system.

In the position estimator scheme, a previously estimated value of spacecraft position is utilized. From this estimated position, $\tilde{r}$, the predicted arrival times at the spacecraft are compared to the detected arrival times. As shown in FIG. 7, the discrepancy in these values provides an estimate of the offset position, $\vec{\delta r}$. As shown in FIG. 7, the error in position will relate to a measured time offset of a pulse, in the line-of-sight to the pulsar. Using pulsars at different locations provides line-of-sight measurements in each pulsar's direction. Combining these different pulsar measurements solves the position offset in three dimensions.

Eq. (21) can be used to determine a position offset. Defining the offset $\vec{\delta r}$ such that, $$\vec{r} - \vec{\tilde{r}} = \vec{\delta r} \quad (25)$$

a time error can be computed by, $$\delta t = t_b(\tau, \vec{r}, \hat{n}, \vec{D}_0, \vec{v}_E) - \tilde{t}_b(\tilde{\tau}, \tilde{r}, \hat{n}, \vec{D}_0, \vec{v}_E) \quad (26)$$

Approximations to the non-linear terms in Eq. (21) can be generated using Eq. (25) as, $$\|\vec{r}\|^2 \approx \|\tilde{r}\|^2 + 2\tilde{r} \cdot \delta\tilde{r} \quad (27)$$

$$(\hat{n} \cdot \vec{r})^2 \approx (\hat{n} \cdot \tilde{r})^2 + 2(\hat{n} \cdot \tilde{r})(\hat{n} \cdot \delta\tilde{r}) \quad (28)$$

$$\ln|\vec{r} \cdot \vec{r} - (\hat{n} \cdot \vec{r})^2| \approx |n|\tilde{r} \cdot \tilde{r} - (\hat{n} \cdot \tilde{r})^2| + \frac{1}{\tilde{r} \cdot \tilde{r} - (\hat{n} \cdot \tilde{r})^2}\left[\frac{\tilde{r} \cdot \delta\tilde{r}}{(\tilde{r} \cdot \tilde{r})^{\frac{1}{2}}} - 2(\hat{n} \cdot \tilde{r})(\hat{n} \cdot \delta\tilde{r})\right] \quad (29)$$

With the above approximations in Eqs. (27), (28), and (29), the expression in Eq. (21) can be placed in linear form with respect to $\vec{\delta r}$ as, $$\delta t_b = \delta\tau + \frac{\hat{n} \cdot \delta\tilde{r}}{c} + \frac{1}{c\|\vec{D}_0\|}[((\hat{n} \cdot \tilde{r})\hat{n} - \tilde{r}) \cdot \delta\tilde{r}] + \frac{2\mu_s}{c^3(\tilde{r} \cdot \tilde{r} + (\hat{n} \cdot \tilde{r})^2)}\left[\left(\frac{\tilde{r}}{(\tilde{r} \cdot \tilde{r})^{\frac{1}{2}}} - 2(\hat{n} \cdot \tilde{r})\hat{n}\right) \cdot \delta\tilde{r}\right] + \frac{1}{c^2}(\vec{v}_E \cdot \delta\tilde{r}) \quad (30)$$

Eq. (30) can be rewritten in vector form as, $$\delta t_b - \delta\tau = \vec{N} \cdot \vec{\delta r} \quad (31)$$

where the vector $\vec{N} = \vec{N}(\tilde{r}, \hat{n}, \vec{D}_0, \vec{v}_E)$ is composed of the terms from Eq. (30).

This linear expression can be assembled for k different pulsars, with sufficiently different locations to create a matrix of observations, $$\begin{bmatrix}(\delta t_b - \delta\tau)_1 \\ (\delta t_b - \delta\tau)_2 \\ \cdot \\ \cdot \\ \cdot \\ (\delta t_b - \delta\tau)_k\end{bmatrix} = \begin{bmatrix}\vec{N}_1 \\ \vec{N}_2 \\ \cdot \\ \cdot \\ \cdot \\ \vec{N}_k\end{bmatrix} \delta\tilde{r} \quad (32)$$

The left-hand side of Eq. (32) is computed using predicted and actual arrival times of a pulse at the SSBC and on the spacecraft. Given a current estimate of $\tilde{r}$ at $\tilde{\tau}$, Eq. (21) can be used to determine the current time at the SSBC, $\tilde{t}_b$. Using Eq. (4), the expected arrival time of the maximum amplitude of phase of the next pulse can be determined, $t_b$. The difference of these can then be computed, $\delta t = t_b - \tilde{t}_b =$ expected arrival time—current time. On the spacecraft, the proper time of a pulse arrival can be measured, $\tau$, and the difference between actual arrival and current time can be calculated $\delta\tau = \tau - \tilde{\tau}$. Using these computations, and the vectors $\vec{N}$, Eq. (32) can be solved for $\vec{\delta r}$, and the estimated position of the spacecraft can be updated using Eq. (25). If no errors in modeling or measurement are present, then Eq. (32) solves for accurate position offsets. However, errors do remain which limit the performance of this system; $\delta t$ contains errors in pulsar modeling, $\delta\tau$ contains system level timing errors and pulse signal timing errors, and these errors along with any errors in parameters of $\vec{N}$ contribute to the errors in $\vec{\delta r}$, including pulsar position uncertainty and earth ephemeris accuracy. A phase cycle ambiguity is still present, as these equations only can relate to a fraction of a cycle and not "which" cycle is being detected. Additionally, vehicle motion that is significant during the time span between current time and pulse arrival time must be addressed in an implementation of this position estimate system. A Kalman filter incorporating vehicle dynamics and a measurement model from Eq. (32) can be used to successfully update vehicle position estimates. Additional complexity is added if one chooses to incorporate binary pulsar observations, and these extra terms must be added to Eq. (32).

XI. Cold-Start Position Determination Method

Although determining an offset to an estimated position is useful for some systems, navigation systems that can determine absolute position using no prior knowledge are very desirable. To determine absolute position from the signals of pulsar 16, shown in FIG. 1, it is necessary to determine which integer signal cycle, or pulse period, is being detected at a certain time. Once it is determined which specific cycle is detected, then range between the SSBC and the spacecraft can be determined along that pulsar's line of sight direction. Pulsars, however, do not place a specific number of their pulses included in their signals, so each pulse 14 can appear to be the same as any other. Pulse cycles from multiple pulsars, however, can be combined to help identify which integer cycles best match a chosen criteria. The set of integer cycles that most appropriately determines the absolute position of the vehicle is selected.

This process is very similar to the GPS integer cycle ambiguity resolution process. Offering an advantage over GPS, pulsars 16 can provide many different cycle, or period, lengths. Some cycles are very small (a few milliseconds) and others are very large (many thousands of seconds), which assists the pulsar cycle resolution method.

XII. Velocity Determination Method

Various applications may require knowledge of a vehicle's velocity, or speed and direction. For instance, when a spacecraft requires an orbital maneuver, the velocity of the vehicle is used to determine the appropriate point in its orbit to accomplish the rocket firing or thrust maneuver.

To determine the velocity of spacecraft 12, a sequence of position estimates can be accumulated using any of the methods described above using pulsars 16. The velocity can be computed using the difference of successive position estimates divided by the time interval between estimates. Thus, velocity represents the differential of position over time.

Alternatively, the time differentiation of Eqs. (4) and (21) can be combined with the time differentiation of Eqs. (25) and (32), to produce an analytical expression of velocity based upon pulsar signal measurements. Because pulsars 16 transmit pulse signals 14 that are periodic in nature, as a spacecraft 12 moves toward or away from the source, Doppler effects will be present in the pulse signal 14 due to the spacecraft's motion. For use with pulsars, second-order and higher Doppler effects may be present which must be included as additional effects in the time differentiation of Eq. (21).

XIII. Attitude Determination Method

Additionally, the attitude of spacecraft 12 may also be determined using the observations taken from the pulsar. Assuming a static or fixed detector 22 on spacecraft 12, the attitude of the vehicle can be determined by detecting the pulse signal 14 and comparing the resulting signal against the database of known pulsar profiles. A detector pointed randomly in the sky will either detect a recognizable source or the X-ray background. For detected signals above the background level, comparisons can be made which help determine which, if any, pulsar is in view of the detector. For a static detector that has to wait until a pulsar enters its field of view during the orbit of the spacecraft, this process may take some time to detect a source. Once a pulsar is detected and identified, however, the pulsar location information provides a means of determining the sensor, and hence the vehicle, attitude. The line-of-sight to the pulsar will be known in inertial frame coordinates, and once detected by the sensor, the sensor to inertial frame transformation provides vehicle attitude. Slowly rotating spacecraft could also use this type of attitude determination process. It is also possible to use X-ray sources that do not pulse successfully within the attitude determination process, as long as these sources are uniquely identifiable, and their position coordinates are known.

Alternatively, a gimbaled sensor system, which allows the sensor to be repositioned to point to any point in the sky, can be used to scan various pulsar locations in the sky to hasten the process of detecting a signal pulsar. Hanson, in his Ph.D. dissertation, "Principles of X-Ray Navigation", 1996, discusses a scheme of using gimbaled sensors to determine attitude using X-ray sources.

XIV. Differential and Relative Navigation Methods

The use of X-ray pulsars, and other variable X-ray sources, is not limited to single spacecraft navigation. For example, an orbiting base station may be used to detect pulsar signals and to transmit pulse arrival times and signal errors to other spacecraft. This base station can also be used to monitor and update pulsar ephemeris information. Ideal locations for these base stations include geosynchronous orbits, and Sun-Earth and Earth-Moon Lagrange points. Receiving spacecraft are able to navigate with improved information relative to the base station. Relative positioning from a main vehicle may also be implemented in a satellite formation-flying concept.

Figure 11:
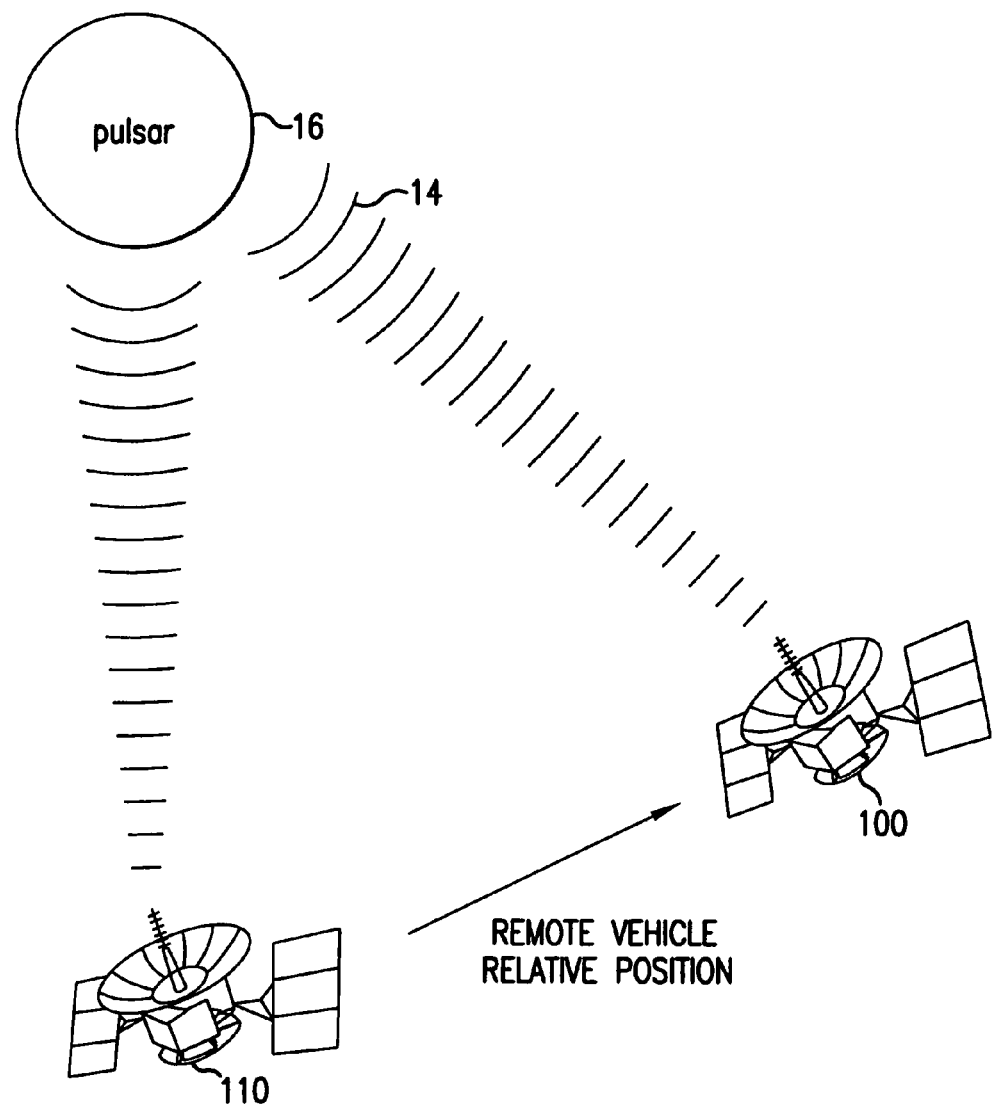
Figure 11:
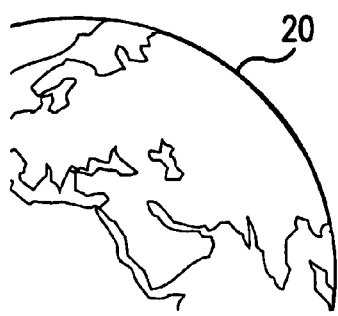

FIG. 11 is a schematic view of the alternative embodiment of the method utilizing sources of pulsed celestial radiation for performing differential and relative navigation. Similar to FIG. 11, a satellite or other spacecraft 100 is in orbit of the Earth 20. The satellite or spacecraft 100 has a X-ray detector or sensor mounted thereon as in the embodiment of FIG. 1, and is sensing the pulsed celestial radiation 14 produced by pulsar 16. In contradistinction to the preferred embodiment of FIG. 1, the embodiment of FIG. 11 includes a second satellite or spacecraft 110 which also receives and senses the celestial radiation 14 produced by pulsar 16. In this system, the position of spacecraft or satellite 100 is determined with respect to the reference station 110.

In this system and method of the embodiment of FIG. 11, the incoming pulsar phase plane is determined at the reference station 110. The reference station then broadcasts the pulsar phase information and, simultaneously, the incoming pulsar phase plane is detected by the remote vehicle 100. The phase solutions generated by both the reference station 110 and the remote vehicle 100 are compared in order to determine the relative position of the remote vehicle 100 with respect to the reference station 110. This differential and relative navigation method allows for the effective transmission of navigational information to spacecraft in a high-Earth orbit in a manner similar to that of the GPS. Utilizing a system such as this allows for easy expansion to interplanetary orbital navigation.

XV. GPS Complement Navigation Method

The pulsar-based system can also be used to complement, or provide an alternative, to vehicles that are able to use the GPS (and other human-made global navigation systems). GPS provides a high quality time signal along with transmitting source position information to allow a receiver to precisely determine its navigation solution about the Earth. Instances may exist where GPS satellites are obscured or unavailable, thus having the pulsar-based navigation system as a back-up to critical systems is a benefit. The pulsar-based system could further be used as a time-only reference system, which may aid high-data rate communication.

XVI. Sensor Instrument

X-ray sensors, such as pulse sensor 22 shown in FIG. 6, mounted on spacecraft 12, are well-known and have successfully flown on many orbital missions, as listed in Table 1. Although the sensor 22 shown in FIG. 6 is illustrated as being mounted on a satellite, this is for exemplary purposes only and the sensor 22 may also be mounted on a spacecraft, planetary rover, or any other sort of well-known mobile platform. Various detectors, such as the one used by the USA Experiment, are gas-filled collimators used to sense the arrival of X-ray photons. Newer sensor technology, such as those based on silicon or germanium, can be used as detectors situated at the base of a collimated container. A coded-aperture mask or focusing X-ray optics may be used to help image the X-ray sources within the field of view. Further, multiple detectors, either within the same sensor unit or positioned at strategic locations throughout the spacecraft surface, could be used to detect the multiple sources over the same time epoch.

Figure 8A:
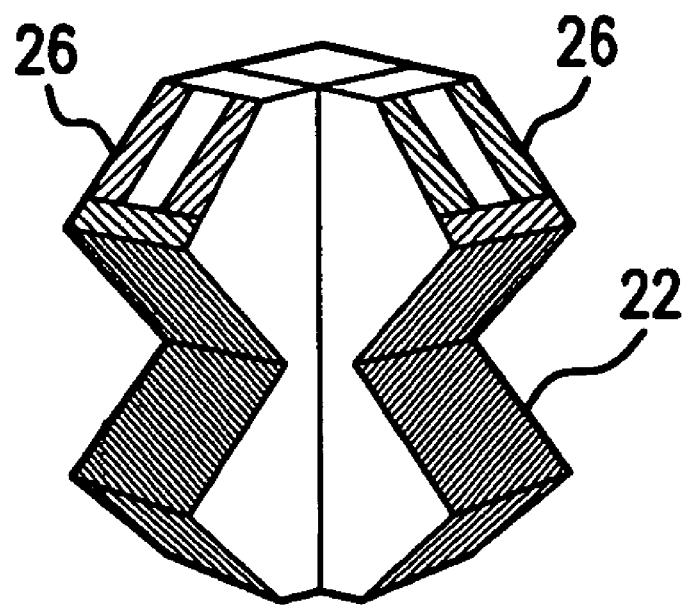
FIG. 8*a* is a side view of the navigational system.
Figure 8B:
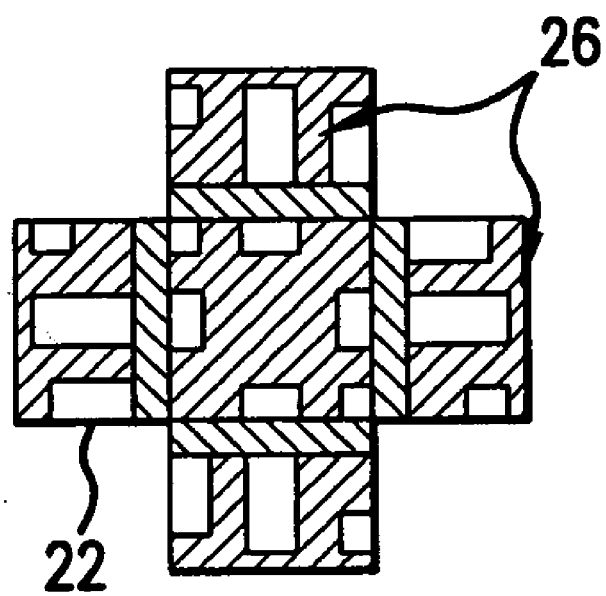
FIG. 8*b* is a top view of the navigational system.

FIG. 8*a* shows a side view of an X-ray detector 22 which may be mounted on a spacecraft 12. The unit is shown as consisting of five detection sub-units, however, any number of individual sub-units or sub-sensors may be utilized. Each detection unit may include a coded-aperture mask 26. FIG. 8*b* shows a top view of the detector 22 and illustrates the individual coded-masks 26.

Additionally, each detection unit may include a containment structure, a thin collimator, and a silicon-strip detector 28, shown in the bottom view of FIG. 8*c,* positioned directly beneath the collimator. The five detection units are positioned with one in a Zenith position and four positioned around this unit at 45° angles to the Zenith position. The containment boxes shown are approximately 10 cm high, 10 cm wide, and 30 cm long, which allows for a 100 cm$^2$ detection area. The containment chambers are positioned for reduced overall size and the photon paths within each chamber intersect, but no X-ray photons or intersecting paths will collide or interact with one another.

FIG. 6 shows a schematic view of the spacecraft or vehicle 12. A pulse sensor 22 is mounted on the spacecraft 12 for detecting X-ray pulses 14 coming from a celestial-object. The X-ray detector 22 may include a collimator for focusing the electromagnetic radiation onto an electromagnetic sensor, such as a silicon or germanium sensor. The pulse sensor 22 is in electrical communication with a processing means 30 and a memory 34. Processing means 30 is further in electrical communication with clock or timer 24. The clock or timer 24 is used for measuring the pulse arrival or pulse time period or duration detected by the pulse sensor 22. The processing means 30 calculates the navigational coordinates of vehicle or satellite 12 utilizing both the timing data and the known position of the X-ray sources stored in an X-ray source almanac in memory 34.

Power is supplied to spacecraft 12 and the processing means and various sensors and control systems by an on-board power supply 32, which may be in the form of a storage battery, solar panels, or other power conversion electronic system. A vehicle control system 40 is mounted on the spacecraft or vehicle 12 and is responsive to signals sent by the processing means or through external telemetry data, and allows for positioning and directional/motion control of the vehicle 12.

External sensors 38 may also be mounted on the spacecraft or vehicle 12, depending upon the specific requirements of the navigational system, and these external sensors may include gyroscopes, accelerometers, a GPS receiver/antenna, a star camera/tracker, a magnetometer, Sun/Earth sensors or the like. The navigation data computed by the external sensors 38 may be used by the processing means 30 to further enhance navigation performance. Data from external sensors 38 may be blended with data from the pulse sensor 22 and clock 24 to produce navigation solutions with improved integrity and accuracy. This data blending can be accomplished using a Kalman filter, or similar data blending algorithm, and can be used in conjunction with the pulse navigation flow diagram of FIG. 9.

Communications with ground monitoring stations, a base station or with other systems may be carried out through communications link 36, which may be a radio receiver/transmitter. Telemetry and navigational data may be transmitted to and from the spacecraft 12, and also the navigational data calculated by processor means 30 may be transmitted to a base station or to other navigational systems.

Figure 9:
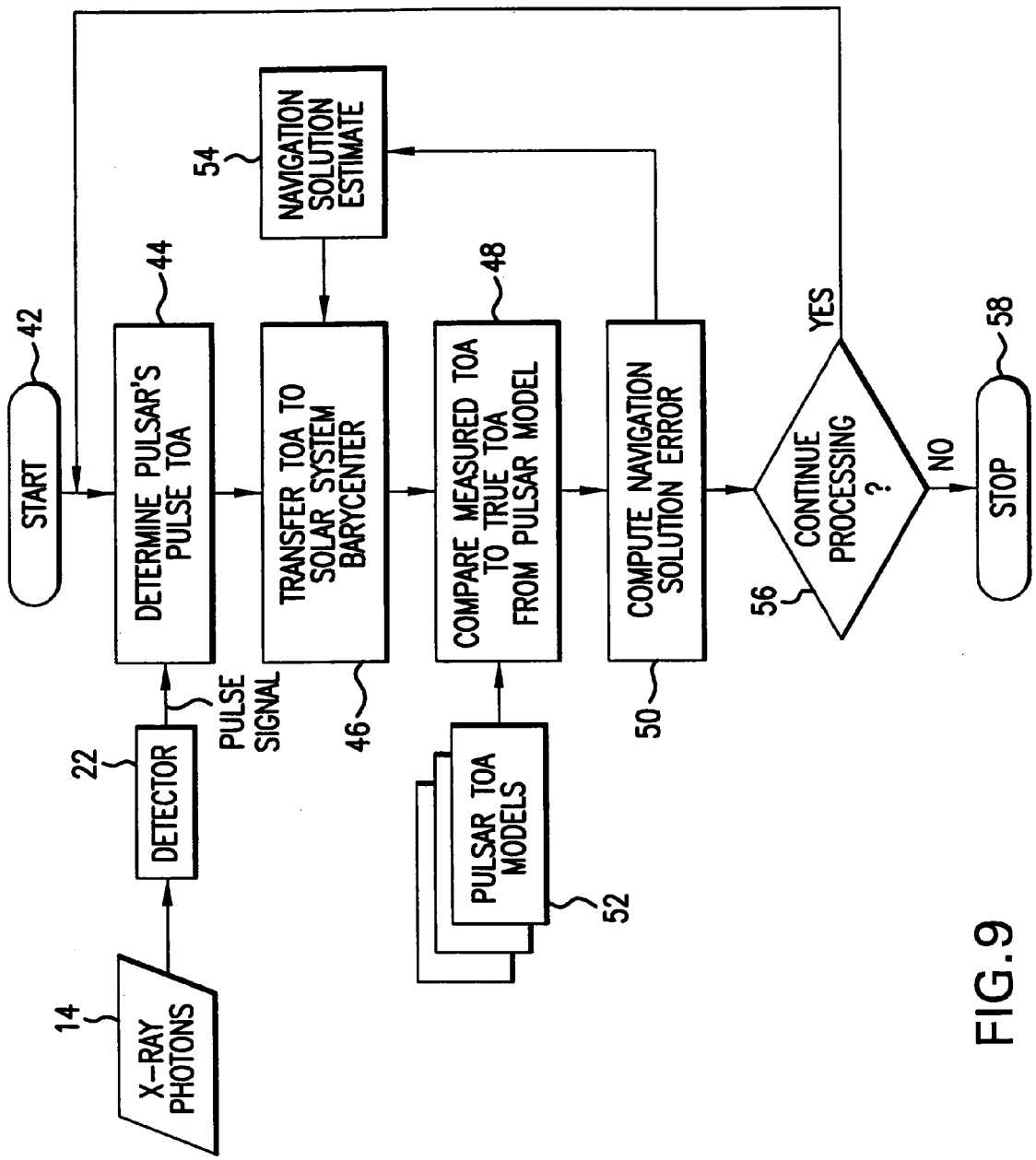
FIG. 9 is a flow chart for the method of navigation utilizing a source of pulsed celestial radiation.

FIG. 9 is a flow diagram illustrating the computer program aided calculation process performed by the navigational system 10. The X-ray photons of pulse 14 are received by the detector 22, mounted on the spacecraft 12 of FIG. 6. The pulse detection signals generated by the pulse signal 22 are sent to processing means 30 at which point the calculation process starts at step 42, shown in FIG. 9. At step 44, the pulsar's pulse time of arrival (TOA) is determined. The pulse time of arrival at the spacecraft 12 is then transformed, or calculated, to the time of arrival at the chosen inertial reference frame, chosen to be the SSBC in FIG. 1.

The time of arrival at the SSBC is then compared at step 48 with a pre-set data set of a pulsar time of arrival model 52. At step 48, the time of arrival offset time is calculated and the navigation solution error is calculated at step 50. If the navigation solution error calculated at step 50 is not within an acceptable range, the position, velocity, attitude and time offset data is transferred to step 54 where the navigational solution estimate is transferred back to step 46 for a recalculation of the time of arrival at the SSBC. This process loop can continue with multiple measurements from the same pulsar 16, as well as with measurements from other pulsars. If the solution error at step 50 is within an acceptable range, the system passes to step 56 where either new navigational data can be processed by the system, or the navigational process is finished at step 58, depending upon the navigational requirements of the user.

Although this invention has been described in connection with specific forms and embodiments thereof, it will be appreciated that various modifications other than those discussed above may be resorted to without departing from the spirit or scope of the invention. For example, functionally equivalent elements may be substituted for those specifically shown and described, and various proportional dimensions and quantities of the elements shown and described may be varied, and in the method steps described, particular steps may be reversed or interposed, all without departing from the spirit or scope of the invention as defined in the appended Claims.

What is claimed is:

1. A navigation system utilizing sources of pulsed celestial radiation comprising:
   displaceable receiver means for detecting signals generated by a plurality of sources of pulsed celestial radiation, each said source having a known position with respect to a reference point in an inertial reference frame;
   timer means for generating time of arrival signals corresponding to time of detection of each said signal, said timer means being in communication with said displaceable receiver means; and,
   processor means for computing navigational data based upon a calculated distance between said displaceable receiver means and said reference point and said known positions of said sources of pulsed celestial radiation, said processor means being in communication with said timer means.

2. The navigation system utilizing sources of pulsed celestial radiation as recited in claim 1 wherein said processor means calculates a time offset between a signal pulse received at said displaceable receiver means and a calculated pulse time of arrival at said reference point.

3. The navigation system utilizing sources of pulsed celestial radiation as recited in claim 1 wherein said reference point is the solar system barycenter.

4. The navigation system utilizing sources of pulsed celestial radiation as recited in claim 1 wherein said displaceable receiver means is mounted on a displaceable receiving platform.

5. The navigation system utilizing sources of pulsed celestial radiation as recited in claim 1 wherein said displaceable receiver means is mounted on a spacecraft.

6. The navigation system utilizing sources of pulsed celestial radiation as recited in claim 1 wherein said processor means is in communication with a digital memory system.

7. The navigation system utilizing sources of pulsed celestial radiation as recited in claim 6 wherein said digital memory system has stored therein a catalog of known sources of pulsed celestial radiation and respective position and pulse characteristics of each said source.

8. The navigation system utilizing sources of pulsed celestial radiation as recited in claim 1 wherein said processor means is in communication with a transmitter for communication with a base station.

9. The navigation system utilizing sources of pulsed celestial radiation as recited in claim 8 wherein said base station is land-based.

10. The navigation system utilizing sources of pulsed celestial radiation as recited in claim 1 wherein said sources of pulsed celestial radiation are pulsars.

11. A navigational method utilizing a source of pulsed celestial radiation comprising the steps of:
    (a) receiving signal pulses from a plurality of sources of pulsed celestial radiation, each said source having known positional and pulse profile characteristics with respect to a reference point in an inertial reference frame;
    (b) generating time of arrival signals corresponding to time of reception of each said signal pulse;
    (c) calculating a pulse time of arrival at said reference point;
    (d) calculating a distance between point of reception of said signal pulses and said reference point; and,
    (e) calculating navigational data from said calculated distance and said known positional and pulse profile characteristics of said sources.

12. The navigational method utilizing a source of pulsed celestial radiation as recited in claim 11 further comprising the step of storing positional and pulse profile data of said sources in a digital memory.

13. The navigational method utilizing a source of pulsed celestial radiation as recited in claim 11 further comprising the step of transmitting said navigational data to a base station.

14. The navigational method utilizing a source of pulsed celestial radiation as recited in claim 11 wherein step (d) includes the calculation of distance between said point of reception and the solar system barycenter.

15. The navigational method utilizing a source of pulsed celestial radiation further comprising the step of establishing a spacecraft and mounting a signal pulse detector thereto.

16. The navigational method utilizing a source of pulsed celestial radiation as recited in claim 15 further comprising the step of transmitting telemetry and control data to said spacecraft.

17. The navigational method utilizing a source of pulsed celestial radiation as recited in claim 11 further comprising the step of calculating an error estimate in said navigational data.

18. The navigational method utilizing a source of pulsed celestial radiation as recited in claim 17 further comprising the step of comparing said error estimate to a set error threshold and returning to step (b) if said error estimate is greater than said error threshold.

19. The navigational method utilizing a source of pulsed celestial radiation as recited in claim 11 wherein said step (c) is followed by a comparison of said pulse time of arrival at said reference point to a pre-calculated pulse time of arrival model.

20. The navigational method utilizing a source of pulsed celestial radiation as recited in claim 19 further comprising the step of storing said pre-calculated pulse time of arrival model in a digital memory.

21. The navigational method utilizing a source of pulsed celestial radiation as recited in claim 11 further comprising the step of blending said calculated navigational data with external sensor data measured by external sensors using a Kalman filter.

* * * * *